US011689318B2

(12) United States Patent
Yavas et al.

(10) Patent No.: US 11,689,318 B2
(45) Date of Patent: Jun. 27, 2023

(54) SYSTEMS AND METHODS FOR COMMUNICATING USING RANDOM CODEWORDS LOCATED WITHIN A RESTRICTED SUBSET OF A MULTI-DIMENSIONAL SPHERE

(71) Applicant: California Institute of Technology, Pasadena, CA (US)

(72) Inventors: Recep Can Yavas, Pasadena, CA (US); Victoria Kostina, Pasadena, CA (US); Michelle Effros, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 56 days.

(21) Appl. No.: 17/146,462

(22) Filed: Jan. 11, 2021

(65) Prior Publication Data

US 2021/0218499 A1 Jul. 15, 2021

Related U.S. Application Data

(60) Provisional application No. 62/959,683, filed on Jan. 10, 2020.

(51) Int. Cl.
*H04L 1/06* (2006.01)
*H04L 12/18* (2006.01)

(52) U.S. Cl.
CPC .......... *H04L 1/0687* (2013.01); *H04L 1/0643* (2013.01); *H04L 12/1868* (2013.01)

(58) Field of Classification Search
CPC ... H04L 1/0041; H04L 1/0643; H04L 1/0687; H04L 1/16; H04L 12/1868; H04L 2001/0092; H04L 2001/0093
See application file for complete search history.

(56) References Cited

U.S. PATENT DOCUMENTS

2021/0218498 A1* 7/2021 Effros .................. H03M 13/63

OTHER PUBLICATIONS

R. C. Yavas, V. Kostina and M. Effros, "Gaussian Multiple and Random Access in the Finite Blocklength Regime," 2020 IEEE International Symposium on Information Theory (ISIT), 2020, pp. 3013-3018, doi: 10.1109/ISIT44484.2020.9174026. (Year: 2020).*
R. C. Yavas, V. Kostina and M. Effros, "Gaussian Multiple and Random Access in the Finite Blocklength Regime," 2020 Information Theory and Applications Workshop (ITA), 2020, pp. 1-25, doi: 10.1109/ITA50056.2020.9244955. (Year: 2020).*

(Continued)

*Primary Examiner* — Nader Bolourchi
(74) *Attorney, Agent, or Firm* — KPPB LLP

(57) ABSTRACT

Communication systems and methods in accordance with various embodiments of the invention employ a rateless coding strategy in which an encoder utilizes codewords located within a restricted subset of a multi-dimensional sphere. In one embodiment, a transmitter is configured to encode message data as symbols using a rateless code until an end of epoch message is received, where the rateless code comprises a set of codewords characterized in that they are located within a restricted subset of a multi-dimensional sphere. A receiver receives observed symbols and at each of a predetermined set of decode times, determines whether a decoding rule is satisfied. When the decoding rule is satisfied, the receiver decodes at least one message using the rateless code and transmits an end of epoch message.

24 Claims, 4 Drawing Sheets

(56) References Cited

OTHER PUBLICATIONS

R. C. Yavas, V. Kostina and M. Effros, "Gaussian Multiple and Random Access Channels: Finite-Blocklength Analysis," in IEEE Transactions on Information Theory, vol. 67, No. 11, pp. 6983-7009, Nov. 2021, doi: 10.1109/TIT.2021.3111676. (Year: 2021).*
R. C. Yavas, V. Kostina and M. Effros, "Random Access Channel Coding in the Finite Blocklength Regime," IEEE Transactions on Information Theory, vol. 67, No. 4, pp. 2115-2140, Apr. 2021, doi: 10.1109/TIT.2020.3047630 (Year: 2021).*
Effros et al., "Random Access Channel Coding in the Finite Blocklength Regime", arXiv.org, Retrieved from: https://arxiv.org/pdf/1801.09018.pdf, Jan. 27, 2018, 9 pgs.
Bassalygo et al., "Restricted Asynchronous Multiple Access", Problemy Peredachi Informatsii, vol. 19, No. 4, 1983, pp. 92-96.
Bentkus, "A Lyapunov-type bound in Rd", Theory of Probability and Its Applications, 2005, vol. 49, No. 2, pp. 311-323, Doi: 10.1137/S0040585X97981123.
Chen et al., "Capacity of Gaussian Many-Access Channels", IEEE Transactions on Information Theory, vol. 63, No. 6, Jun. 2017, pp. 3516-3539.
Chen et al., "Lossless Source Coding in the Point-to-Point, Multiple Access, and Random Access Scenarios", 2019 IEEE International Symposium on Information Theory (ISIT), Jul. 2019, pp. 1692-1696, Doi: 10.1109/ISIT.2019.8849742.
Chen et al., "Many-Access Channels: The Gaussian Case with Random User Activities", arXiv: 1405.0893v1 [cs.IT], May 5, 2014, 5 pgs.
Devroye et al., "The total variation distance between high-dimensional Gaussians", arXiv: 1810.08693, Oct. 18, 2019, 11 pgs.
Ebrahimi et al., "Coded random access design for constrained outage", Proceedings of the IEEE International Symposium on Information Theory (ISIT), Aachen, Germany, Jun. 25-30, 2017, pp. 2732-2736.
Fong et al., "A proof of the strong converse theorem for gaussian multiple access channels", IEEE Transactions on Information Theory, vol. 62, Aug. 2016, pp. 4376-4394, arXiv: 1509.01380.
Kowchik et al., "Fundamental limits of many-user MAC with finite payloads and fading", arXiv: 1901.06732, 2019, 34 pgs.
Kowshik et al., "Energy efficient random access for the quasi-static fading MAC", 2019 IEEE International Symposium on Information Theory (ISIT), Jul. 2019, pp. 2768-2772, Doi: 10.1109/ISIT.2019.8849288.
Laurent et al., "Adaptive Estimation of a Quadratic Functional of a Density by Model Selection", Ann. Statist, vol. 28, No. 5, 2000, pp. 1302-1338.
Liu et al., "Finite-Blocklength and Error-Exponent Analyses for LDPC Codes in Point-to-Point and Multiple Access Communication", arXiv:2005.06428, May 13, 2020, 32 pages.
Mathys, "A class of codes for a T active users out of N multiple-access communication system", IEEE Transactions on Information Theory, vol. 36, No. 6, Nov. 1990, pp. 1206-1219.
Molavianjazi, "A unified approach to Gaussian channels with finite blocklength", University of Notre Dame, Doctor of Philosophy Thesis, 2014, 236 pgs.
Molavianjazi et al., "A Second-Order Achievable Rate Region for Gaussian Multi-Access Channels via a Central Limit Theorem for Functions", IEEE Transactions on Information Theory, vol. 61, No. 12, Dec. 2015, pp. 6719-6733, Doi: 10.1109/TIT.2015.2492547.
Ordentlich et al., "Low Complexity Schemes for the Random Access Gaussian Channel", Proceedings of the IEEE International Symposium on Information Theory (ISIT), Aachen, Germany, Jun. 25-30, 2017, 10 pgs.
Paris, "An inequality for the Bessel function Jv(vx)", SIAM Journal on Mathematical Analysis, vol. 15, No. 1, 1984, pp. 203-205, doi: 10.1137/0515016.
Polyanskiy, "A perspective on massive random-access", Proceedings of the IEEE International Symposium on Information Theory (ISIT), Aachen, Germany, Jun. 25-30, 2017, 5 pgs.
Polyanskiy, "Channel coding: non-asymptotic fundamental limits", Princeton University Dissertation, Doctor of Philosophy, Nov. 2010, 282 pgs.
Polyanskiy et al., "Channel Coding Rate in the Finite Blocklength Regime", IEEE Transactions on Information Theory, vol. 56, No. 5, May 2010, pp. 2307-2359, Doi 10.1109/TIT.2010.2043769.
Polyanskiy et al., "Lecture Notes on Information Theory", MIT (6.441), UIUC (ECE 563), Yale (STAT 664), 2012-2017, 342 pgs.
Raic, "A multivariate Berry-Esseen theorem with explicit constants", arXiv: 1802.06475, 2019, 30 pgs.
Roberts, "Aloha packet system with and without slots and capture", ACM SIGCOMM Computer Communication Review, vol. 5, No. 2, Apr. 1975, pp. 28-42.
Rump, "Estimates of the determinant of a perturbed identity matrix", Linear Algebra and its Applications, vol. 558, Dec. 1, 2018, pp. 101-107, https://doi.Org/10.1016/j.laa.2018.08.009.
Scarlett et al., "Second-Order Rate Region of Constant-Composition Codes for the Multiple-Access Channel", IEEE Transactions on Information Theory, vol. 61, No. 1, Jan. 2015, pp. 157-172, Doi: 10.1109/TIT.2014.2371026.
Shannon, "Probability of Error for Optimal Codes in a Gaussian Channel'", Bell System Technical Journal, vol. 38, No. 3, May 1959, pp. 611-656, https://doi.0rg/10.1002/j. 1538-7305.1959.tb03905.x.
Shannon et al., "A Mathematical Theory of Communication", The Bell System Technical Journal, vol. 27, July, Oct. 1948, 379-423, 623-656.
Stam, "Limit theorems for uniform distributions on spheres in high-dimensional euclidean spaces", Journal of Applied Probability, vol. 19, vol. 1, 1982, pp. 221-228, doi: 10.2307/3213932.
Tan et al., "On the Dispersions of Three Network Information Theory Problems", IEEE Transactions on Information Theory, vol. 60, No. 2, Feb. 2014, pp. 881-903, arXiv: 1201.3901.
Tan et al., "The Third-Order Term in the Normal Approximation for the AWGN Channel", IEEE Transactions on Information Theory, vol. 61, No. 5, May 2015, pp. 2430-2438 https://doi.0rg/10.1002/j.1538-7305.1959.tb03905.x.
Zadik et al., "Improved bounds on Gaussian MAC and sparse regression via Gaussian inequalities", IEEE International Symposium on Information Theory—Proceedings, Jul. 2019.

* cited by examiner

SYSTEMS AND METHODS FOR COMMUNICATING USING RANDOM CODEWORDS LOCATED WITHIN A RESTRICTED SUBSET OF A MULTI-DIMENSIONAL SPHERE

CROSS-REFERENCE TO RELATED APPLICATIONS

The present invention claims priority to U.S. Provisional Patent Application Ser. No. 62/959,683 entitled "Gaussian Multiple and Random Access in the Finite Blocklength Regime" to Yavas et al., filed Jan. 10, 2020, the disclosures of which is herein incorporated by reference in its entirety.

STATEMENT OF FEDERALLY SPONSORED RESEARCH

This invention was made with government support under Grant No. CCF1817241 awarded by the National Science Foundation. The government has certain rights in the invention.

FIELD OF THE INVENTION

The present invention relates generally to communication systems and more specifically to communication systems capable of communicating via Gaussian point-to-point, fading point-to-point, Gaussian Multiple Access Channels (MAC), Gaussian Random Access Channels (RAC), Fading MACs, and Fading RACs.

BACKGROUND

Emerging communication systems such as the Internet of Things, wireless cellular networks, and machine-to-machine communication systems impose two significant requirements on the code design: low latency constraints and random activity involving a large number of communicating devices. Investigators have studied random access channels in the finite blocklength regime, where an unknown number of transmitters is active, and communication delay is finite.

Current random access strategies mostly use either orthogonalization (TDMA, FDMA, and CDMA) or collision avoidance (e.g., slotted ALOHA). Orthogonalization methods divide up resources (e.g., time, frequency, or signals) among the transmitters. In slotted ALOHA, each transmitter randomly chooses a time slot to transmit its message, and the decoder declares an error if two or more transmitters are active in a time slot. For example, slotted ALOHA achieves only 37% of the single-transmitter capacity.

For a single transmitter, the capacity of a Gaussian channel is $$C(P) = \frac{1}{2}\log(1+P) \tag{1}$$

using codewords with symbols drawn independently and identically distributed (i.i.d.) according to the Gaussian distribution with variance P−δ for a very small value δ; where P is the maximal (per-codeword) power constraint, and the noise variance is 1.

In Claude Shannon, Probability of error for optimal codes in a Gaussian channel, Bell System Technical Journal, 38 (3) pp. 611-656, Shannon shows the performance improvement in the achievable reliability function using codewords drawn uniformly at random on an n-dimensional sphere of radius $\sqrt{nP}$ and a maximum likelihood decoder.

In Vincent Yan Fu Tan, and Marco Tomamichel, The third-order term in the normal approximation for the AWGN channel, IEEE Transactions on Information Theory 61.5 (2015), 2430-2438, Tan and Tomamichel use the same distribution and decoder to prove the achievability of a maximal rate of $$C(P) - \sqrt{\frac{V(P)}{n}}Q^{-1}(\epsilon) + \frac{1}{2}\frac{\log n}{n} + O\left(\frac{1}{n}\right) \tag{2}$$

under blocklength n and average error probability ϵ, where $$V(P) = \frac{P(P+2)}{2(1+P)^2} \tag{3}$$

is the dispersion of the point-to-point Gaussian channel.

The first- and second-order terms in (2) remain the same under maximal-error and both maximal- and average-power constraints across codewords, they differ under average-error and average-power constraints.

Extending the asymptotic expansion in (2) to a Gaussian MAC, in which multiple transmitters communicate independent messages to a single receiver over a Gaussian channel with blocklength n, is not trivial. The result (2) can be generalized to the two-transmitter MAC, bounding the achievable rate as a function of the 3×3 dispersion matrix. $V(P_1, P_2)$, an analogue of V (P) assuming transmitters with per-codeword power constraints $P_1$ and $P_2$.

SUMMARY OF THE INVENTION

Communication systems and methods in accordance with various embodiments of the invention can be utilized within a communication scenario where K transmitters are communicating with a single receiver through a Gaussian channel or a Fading channel. In several embodiments, the communication system can be a point-to-point communication system. In a number of embodiments, the communication system is a multiple access communication system in which the identity of active transmitters is known to all transmitters and to the receiver. In certain embodiments, the communication system is a random access communication system in which the set of active transmitters is typically unknown to the transmitters and to the receiver. In many embodiments, a rateless coding strategy is utilized within the communication system in which each encoder utilizes codewords on a restricted subset of a multi-dimensional sphere. In several embodiments, the restricted subset includes codewords that are either on a subset of the surface of the multi-dimensional sphere or close to the subset of the surface of multi-dimensional sphere. In a number of embodiments, at least some of the codewords are on a subset of the surface of the multi-dimensional sphere. In certain embodiments, all codewords are on a subset of the surface of the multi-dimensional sphere. In other embodiments, each encoder utilizes codes codewords from some internal portion of the sphere close to its surface (e.g., on the surface of a smaller sphere inside the power sphere). In many embodiments, different encoders choose their codewords dependently.

One embodiment of a communication system includes a plurality of transmitters that each have an encoder, where the encoder of a given transmitter is configured to: receive a start of epoch message; encode message data as symbols using a rateless code comprising a set of codewords characterized in that they are located within a restricted subset of a multi-dimensional sphere; and receive feedback messages at a predetermined set of potential decoding times. In addition, the transmitter is configured to transmit symbols until a received feedback message is an end of epoch message. The communication system also includes a receiver comprising a decoder, where the decoder is configured to: cause a broadcast transmitter to transmit at least one start of epoch message; receive observed symbols; and at each of a predetermined set of decode times, determine whether a decoding rule is satisfied. In addition, when the decoding rule is satisfied the receiver is configured to: decode at least one message based upon the received observed symbols based upon the rateless code: and cause the broadcast transmitter to transmit an end of epoch message.

In a further embodiment, the restricted subset of the multi-dimensional sphere includes a subset of a surface of the multi-dimensional sphere and an internal portion of the multi-dimensional sphere proximate the subset of the surface of the multi dimensional sphere.

In another embodiment, the restricted subset of the multi-dimensional sphere comprises a subset of a surface of the multi-dimensional sphere.

In a still further embodiment, the determination of whether a decoding rule is satisfied is based upon the received observed symbols.

In a still further embodiment, the decoding rule combines a threshold rule based on the total received power and a maximum likelihood decoding rule.

In still another embodiment, the codewords Located within the restricted subset of the multi-dimensional sphere include a number of codewords M of blocklength $n_K$, and the multi-dimensional sphere is characterized by a radius equal to $\sqrt{n_K P}$.

In a yet further embodiment, the code words located within the restricted subset of the multi-dimensional sphere comprise a number of codewords M of blocklength $n_K$ that are each concatenated from sub-codewords of blocklengths $n_1, n_2-n_1, \ldots n_K-n_{K-1}$; and each of the sub-codewords of blocklengths $n_1, n_2-n_1, \ldots n_K-n_{K-1}$ is characterized in that sub-codewords of blocklengths $n_i-n_{i-1}$ lie on a restricted subset of a multi-dimensional sphere of radius $\sqrt{(n_i-n_{i-1})P}$.

In yet another embodiment, the codewords located within the restricted subset of the multi-dimensional sphere are further characterized in that, when k trap transmitters from the plurality of transmitters are active, codewords of blocklength $n_k$ formed from concatenating the sub-codewords of blocklengths $n_1, n_2-n_1, \ldots n_{k-1}$ are located within a restricted subset of a multi-dimensional sphere $\sqrt{n_K P}$.

In a further embodiment again, multiple transmitters in the plurality of transmitters are configured to select the same rateless code to use in the encoding of message data as symbols.

In another embodiment again, at least, two of the plurality of transmitters are configured to select different rateless codes to use in the encoding of message data as symbols.

In a further additional embodiment, the receiver is configured to apply decoding rules at separate predetermined times with respect to each of the different codebooks.

In another additional embodiment, the broadcast transmitter is configured to send a negative feedback message when the decoding rule is not satisfied at a predetermined decode time.

In a still yet further embodiment, the encoder is configured to continue to encode message data as symbols using the rateless code in response to receipt of a negative feedback message.

In still yet another embodiment, the receiver is further configured to measure characteristics of the channel and select the predetermined set of decoding times based upon the measured channel characteristics, A transmitter in accordance with a still further embodiment again includes: a receiver configured to receive a start of epoch message; an encoder configured to encode message data as symbols rising a rateless code including a set of codewords characterized in that they are located within a restricted subset of a multi-dimensional sphere; and a modulator configured to transmit symbols encoded by the encoder. In addition, the receiver is further configured to receive an end of epoch message at one of a predetermined set of tunes; and the modulator is configured to transmit symbols encoded by the encoder until an end of epoch message is received by the receiver.

In still another embodiment again, the encoder is configured to continue to encode message data as symbols using the rateless code in response to receipt of a negative feedback message.

In a still further additional embodiment, the restricted subset of the multi-dimensional sphere comprises a subset of a surface of the multi-dimensional sphere and an internal portion of the multi-dimensional sphere proximate the subset of the surface of the multi-dimensional sphere.

In still another additional embodiment, the restricted subset of the multi-dimensional sphere comprises a subset of a surface of the multi-dimensional sphere.

A receiver n accordance with a yet further embodiment again includes: a decoder configured to select at least one codebook; a transmitter configured to transmit at least one start of epoch message; and a receiver configured to receive observed symbols. In addition, the decoder is further configured to determine whether a decoding rule is satisfied at each of a predetermined set of decode times, and when the decoding rule is satisfied: decode at least one message based upon the received observed symbols based upon a rateless code comprising a set of codewords characterized in that they are located within a restricted subset of a multi-dimensional sphere, and cause the transmitter to transmit an end of epoch message.

In yet another embodiment again, the determination of whether a decoding rule is satisfied is based upon the received observed symbols.

In a yet further additional embodiment, the decoding rule combines a threshold rule based on the total received power and a maximum likelihood decoding rule.

In yet another additional embodiment, the broadcast transmitter sends a negative feedback message when the decoding rule is not satisfied at a predetermined decode time.

In a further additional embodiment again, the restricted subset of the multi-dimensional sphere comprises a subset of a surface of the multi-dimensional sphere and an internal portion of the multi-dimensional sphere proximate the subset of the surface of the multi-dimensional sphere.

In another additional embodiment again, the restricted subset of the multi-dimensional sphere comprises a subset of a surface of the multi-dimensional sphere.

DETAILED DESCRIPTION

Figure 1:
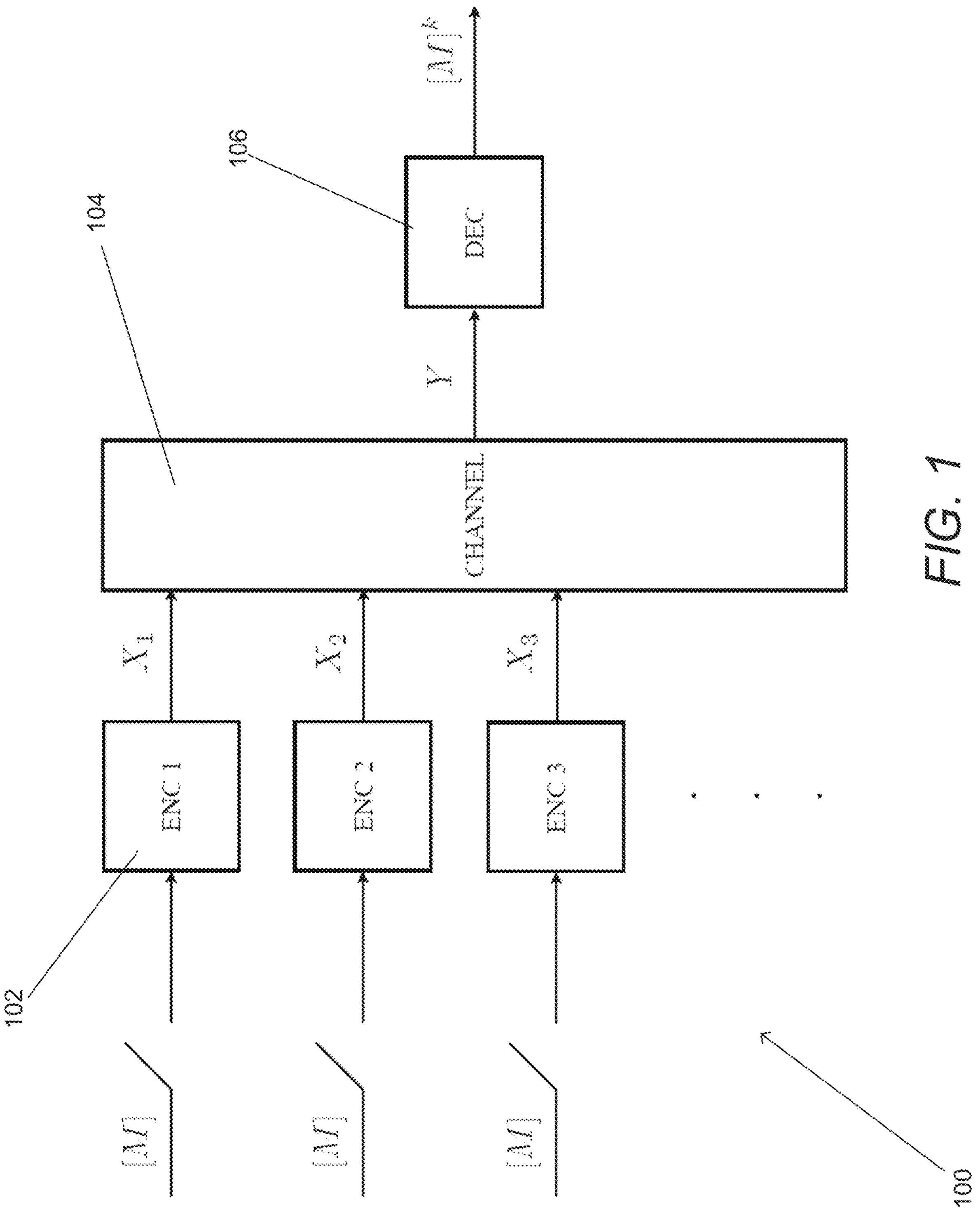
FIG. 1 conceptually illustrates a receiver configured to control the transmission of transmitters during epochs defined by the receiver in accordance with an embodiment of the invention.

Turning now to the drawings, communication system and methods in accordance with various embodiments of the invention are illustrated that can be utilized within a communication scenario where K transmitters are communicating with a single receiver through a Gaussian channel or a Fading channel. In several embodiments, the communication system can be a point-to-point communication system and the transmitter transmits using a rateless code for a predetermined epoch or until a receiver provides a feedback message indicating the end of an epoch and that the message was successfully decoded. In multiple access communication systems, the identity of active transmitters is typically known to all transmitters and to the receiver. In random access communication systems, the set of active transmitters is typically unknown to the transmitters and to the receiver. Both the MAC and RAC channels are characterized in that transmitters can transmit simultaneously on the same channel (colliding with each other) and a receiver can decode the messages being transmitted by each of the transmitters (despite the messages being transmitted simultaneously).

In a number of embodiments, a rateless coding strategy is utilized within the communication system in which each encoder utilizes codewords on a restricted subset of a multi-dimensional sphere. In several embodiments, the restricted subset includes codewords that are either on a subset of the surface of the multi-dimensional sphere or close to the subset of the surface of multi-dimensional sphere. In a number of embodiments, at least some of the codewords are on a subset of the surface of the multi-dimensional sphere. In certain embodiments, all codewords are on a subset of the surface of the multi-dimensional sphere. In other embodiments, each encoder utilizes codewords horn some internal portion of the sphere close to its surface (e.g., on the surface of a smaller sphere inside the power sphere). In many embodiments, different encoders choose their codewords dependently.

In several embodiments, the decoder attempts to decode only at a finite set of decoding times. At each decoding time within the set of decoding times, in sonic embodiments, the receiver broadcasts the acknowledgment to one or more transmitters indicating whether or not a transmitter can cease transmitting the message being transmitting using a rateless code. When employed in Fading channels, receivers in accordance with many embodiments of the invention estimate channel characteristics (e.g., fading coefficients) and utilize these estimates to determine appropriate codebooks and/or decoding times. In several embodiments, the receiver can transmit messages to the encoders indicating an appropriate codebook(s) and/or a set of decoding times. In certain embodiments, the receiver employs a maximum likelihood decoder to perform decoding. The term maximum likelihood decoder is typically utilized to describe a decoder that performs decoding based upon selecting the received codeword(s) that are the highest probability to have been transmitted given the signal that was received. In several embodiments, the receiver employs other decoding rules such as a single threshold rule or multiple simultaneous threshold rules. In point-to-point communication systems, the transmitter and receiver can also agree in advance on the duration of the epoch and coordinate changes in the duration of an epoch from one epoch to the next to achieve adaptive coding and modulation using the rateless code. In several embodiments, the duration of a specific epoch within a point-to-point communication is unknown at the start of the epoch and determined by the receiver based upon received symbols using one or more decoding rules.

Systems and methods in accordance with many embodiments of the invention utilize this new coding scheme to communicate via a Gaussian RAC in a manner that provides superior performance compared to prior uses of rateless codes. Use of rateless codes to communicate in a random MAC is described in Michelle Effros, Kostina Victoria, and Recep Can Yavas, Random access channel coding in the finite blocklength regime, 2018 IEEE International Symposium on Information Theory (ISIT) and Recep Can Yavas, Victoria Kostina, and Michelle Effros, Random access channel coding in the finite blocklength regime, in IEEE Transactions on Information Theory, doi: 10.1109/TIT.2020.3047630, the disclosure of which including the disclosure of rateless codes and their use in communicating via RACs is hereby incorporated by reference in its entirety.

In a number of embodiments, one or more transmitters and a receiver utilize codewords obtained by concatenating K sub-codewords of blocklengths $n_1$, $n_2-n_1$, . . . , $b_K-n_{K-1}$, each lies on or near a subset of a surface of a sphere of radius $\sqrt{(n_i-n_{i-1})P}$. In RAC communication systems where k transmitters are active, the resulting codewords are located within a restricted subset of the sphere of radius $\sqrt{n_K P}$. In several embodiments, the sub-codewords of blocklengths $n_1$, $n_2-n_1$, . . . , $n_K-n_{K-1}$ are located within a restricted subset of, or in some internal portion of a sphere of radius $\sqrt{(n_i-n_{i-1})P}$. The receiver can use output typicality to determine the number of transmitters and then can apply a maximum likelihood decoder. In a number of embodiments, receivers combine maximum likelihood decoding with a single threshold test based on the received power to decode messages from unknown number of active transmitters.

In several embodiments, an encoder employ random coding. The random codewords are generated by concatenating K sub-codewords of blocklengths $n_1$, $n_2-n_1$, . . . , $n_K-n_{K-1}$, each drawn from a uniform distribution on the surface of a sphere of radius $\sqrt{(n_i-n_{i-1})p}$. When k transmitters are active, the resulting codewords can be uniformly distributed on a restricted subset of the surface of a sphere of radius $\sqrt{n_l P}$. In some embodiments, the codewords are distributed uniformly or non-uniformly on a subset of the sphere or on a subset of the internal portion of the sphere (e.g., a smaller sphere inside the power sphere). In several embodiments, the portions of the codewords (i.e., the sub-codewords of sizes $n_1$, $n_2-n_1$, . . . ) are drawn according to dependent distributions. In many embodiments, the codewords are drawn from a subset of the surface of the sphere, and/or each sub-codeword is drawn according to a conditional distribution that depends on the values of the symbols in the prior sub-codewords. For example, for any subset of the surface of the $n_K$-dimensional power sphere for which the maximal power constraint is satisfied for decoding times $n_1$, . . . , $n_K$, a uniform distribution on that subset can be achieved by an appropriate choice of the conditional distributions from which the sub-codewords are drawn.

In a number of embodiments, the receiver broadcasts a feedback message (e.g., a single bit) to all transmitters at each potential decoding time, indicating whether or not it is ready to decode. In several embodiments, a decoding rule is utilized by the decoder that combines a threshold rule based on the total received power and a maximum likelihood decoder. As is discussed below, communication systems that employ the rateless Gaussian RAC codes described herein can achieve the same performance up to a third-order term as the best known codes for the Gaussian MAC.

In several embodiments, a communication system capable of communicating via a RAC can achieve additional efficiency gains by detecting early within a time epoch that an unusually large number of transmitters have commenced simultaneously transmitting. Instead of requiring all transmitters to continue to transmit with a long blocklength, the receiver can transmit a feedback message ending the epoch and indicating to one or more of the transmitters that they should wait a period of time before attempting to retransmit. In several embodiments, the period of time that a transmitter waits before attempting to retry transmitting its message can be a number of time epochs specified by the transmitter. In certain embodiments, the period of time can be a random number of time epochs determined by the transmitter.

Systems and methods in accordance with various embodiments of the invention can also be utilized to communicate via point-to-point fading channels and/or the fading RAC. When communicating via the fading RAC, communication systems in accordance with many embodiments of the invention estimate channel characteristics and determine decoding times based upon the estimated channel characteristics. While the discussion herein focuses on Gaussian and fading channels with maximal-power and average-error constraints, the systems and methods described herein may be useful beyond these exemplary channel and communication scenarios. As can be readily appreciated, the specific manner in which data is encoded and decoded when communicating on MACs and/or RACs is largely dependent upon the requirements of specific application. communication systems and methods in accordance with various embodiments of the invention are discussed further below.

Systems and Methods for Communicating Using Rateless Codes

A receiver configured to control the transmission of transmitters during epochs defined by the receiver in accordance with an embodiment of the invention is conceptually illustrated in FIG. 1. The communication system 100 includes at least one transmitter, and each transmitter includes an encoder 102. Each transmitter that has message data to transmit can choose to become active during any given epoch. Where only one transmitter is present, the communication system is a point-to-point communication system. When multiple transmitters are present, the communication system can act as a MAC and/or RAC communication system in which multiple transmitters can simultaneously transmit on a shared communication channel. When a transmitter is active, the transmitter can provide a sequence of message bits to a rateless encoder 102, which generates a sequence of output symbols that are transmitted over a channel 104. When multiple transmitters are active, the active transmitters simultaneously transmit over the channel 104 to a receiver. As discussed above, the use of rateless codes enables the receiver to continue to receive symbols (i.e., extend the duration of a particular epoch) until the receiver's decoder 106 has observed enough symbols to decode the transmitted messages with high probability. In many embodiments, the decoder employs a decoding rule that is applied at a predetermined set of potential decoding times. In several embodiments, each potential decoding time in the set of potential decoding times corresponds to a number of symbols determined to be required for the decoder to be able to decode messages from a specific number of transmitters. In certain embodiments, application of the decoding rule essentially involves attempting to decode a number of messages at each potential decoding time, which indirectly provides an estimate of the number of transmitters that are active during an epoch. Based upon the decoding rule, the decoder can attempt decoding at each subsequent decoding time in the set of potential decoding times. It chooses the first decoding time from that set for which it finds a collection of messages consistent with its received symbols and with the activity set or sets corresponding to that decoding time. As noted above, the receiver can also utilize a criterion to detect that an unusually large number of transmitters are transmitting. In which case, the receiver can send a feedback message ending the epoch and directing that transmitters wait a period of time (e.g., a random number of epochs) before attempting to retry transmitting a message.

As noted above, the receiver need not continuously transmit its decoding state to the transmitters. In a number of embodiments, the transmitters and the receiver establish a set of potential decoding times and the receiver sends a negative or positive feedback message, at each potential decoding time indicating whether the receiver requires more symbols to be able to decode the messages with a high probability (i.e., a negative feedback message') or whether the receiver has received enough symbols and has decided to decode the messages and start a new epoch (i.e., a positive feedback message). In a number of embodiments, a feedback bit '0' is utilized to send a negative feedback message, and a feedback bit '1' is utilized to send a positive feedback message.

In many embodiments, the set of potential decoding times is determined based upon channel conditions. As the channel deteriorates and/or experiences fading, the receiver can adapt and choose a set of potential decoding times where the number of symbols required to be received during an epoch for a given estimated number of transmitters increases. In several embodiments, the decoder can first attempt to estimate the channel conditions and then determine a codebook and/or appropriate decoding times, which can be communicated to the transmitters. When the channel improves/changes the receiver can adapt to a set of potential decoding times in which the number of symbols required to be received for a given estimated number of transmitters decreases. In several embodiments where the channel behaviour is changing sufficiently slowly, the receiver estimates the channel parameters after some fixed period and broadcasts these estimates to the transmitters at the end of that fixed period. In many embodiments, transmitters would know when to listen for this feedback signal and also how to calculate the potential decoding times using that feedback. In other embodiments where the channel behavior is changing more quickly, the receiver sends the updated estimates of the channel parameters and/or updated next feedback times at each time feedback is sent (e.g., at each potential decoding time). In a number of embodiments, the receiver adapts the set of potential decoding times utilized during a particular epoch based upon a measurement of channel conditions including (but not limited to) channel noise and/or fading coefficients. In several embodiments, the receiver periodically signals a guard interval in which transmitters are re fired to cease activity. During this guard interval, the receiver can measure channel noise and determine an appropriate set of potential decoding times. In a number of embodiments, transmitters transmit a pilot sequence and the receiver can use this known sequence to estimate the fading characteristics of the channel. The receiver can then broadcast the set of potential decoding times and/or an identifier of the set of potential decoding times to the transmitters and can initiate the next epoch via a positive feedback message. The transmitters can then monitor the feedback channel for negative and positive feedback messages based upon the set of potential decoding times communicated by the receiver. Although specific methods are described for adapting between different sets of potential decoding times, it can readily be appreciated that any of a variety of techniques can be utilized for determining an appropriate set of decode times for a given set of channel conditions and coordinating the adoption of such a set of decode times by the receiver and transmitters in accordance with various embodiments of the invention.

In a number of embodiments, all transmitters use the same encoder 102 and the receiver broadcasts an indication of a particular codebook to use in a given epoch. In several embodiments, the transmitters are able to use different codebooks. Using different codebooks can enable the decoder to identify the transmitter that transmitted a specific message decoded by the decoder 106. Using different codebooks can also enable the encoders to transmit different numbers of messages and attain different rates. When transmitters encode rising different encoders, the receiver can transmit information indicating the specific codebook to be used by a particular encoder at the start of a particular epoch. The receiver can then utilize knowledge of the different codebooks in the decoding of the transmitted messages from the observed symbols.

Although specific communication systems are described above with reference to FIG. 1, any of a variety of transmitters and receivers that employ the rateless codes described herein can be utilized to transmit data over a MAC and/or RAC channel as appropriate to the requirements of a given application in accordance with various embodiments of the invention. Indeed, communication systems in accordance with various embodiments of the invention are in no way limited to any particular communication medium, spectral band, and/or modulation or demodulation scheme. Symbols encoded in accordance with various embodiments of the invention can be transmitted using any number of different modulation schemes appropriate to the requirements of a given application and/or can employ additional outer codes to correct bit errors in the messages decoded by the receiver. The transmitters and receivers described herein should be understood as being capable of being deployed in any communication system in which an unknown number of transmitters utilize a shared channel to communicate with a receiver. A number of specific encoding and decoding processes in accordance with different embodiments of the invention are discussed below.

Processes for Encoding Data for Transmission

Transmitters in accordance with various embodiments of the invention are configured to wait to transmit data until the start of an epoch and then transmit data throughout the epoch while listening periodically for a positive feedback message that indicates the end of the epoch. In many embodiments, the end of the epoch can be agreed upon from one epoch to the next by one or more transmitters and a receiver. In several embodiments, a transmitter can determine the end of the epoch by listening periodically for a positive feedback message that indicates the end of the epoch. As discussed above, in many embodiments of the invention, the codebook selected for the rateless code is coordinated with the receiver and includes codewords characterized in that they are located within a restricted subset of a multi-dimensional sphere. In several embodiments, the restricted subset includes a subset of the surface of the multi-dimensional sphere and a region proximate the subset of the surface of the multi-dimensional sphere. In many embodiments, the restricted subset is a subset of the surface of the multi-dimensional sphere. In other embodiments, the codewords lie within an internal portion of a smaller multi-dimensional sphere (e.g., a smaller sphere inside the power sphere). In several embodiments, transmitters choose their codewords dependently. In many embodiments, the transmitter monitors a feedback channel for a transmission from a receiver containing a codebook and/or an identifier for a codebook to be utilized within a specified (e.g., the next) epoch.

Figure 2:
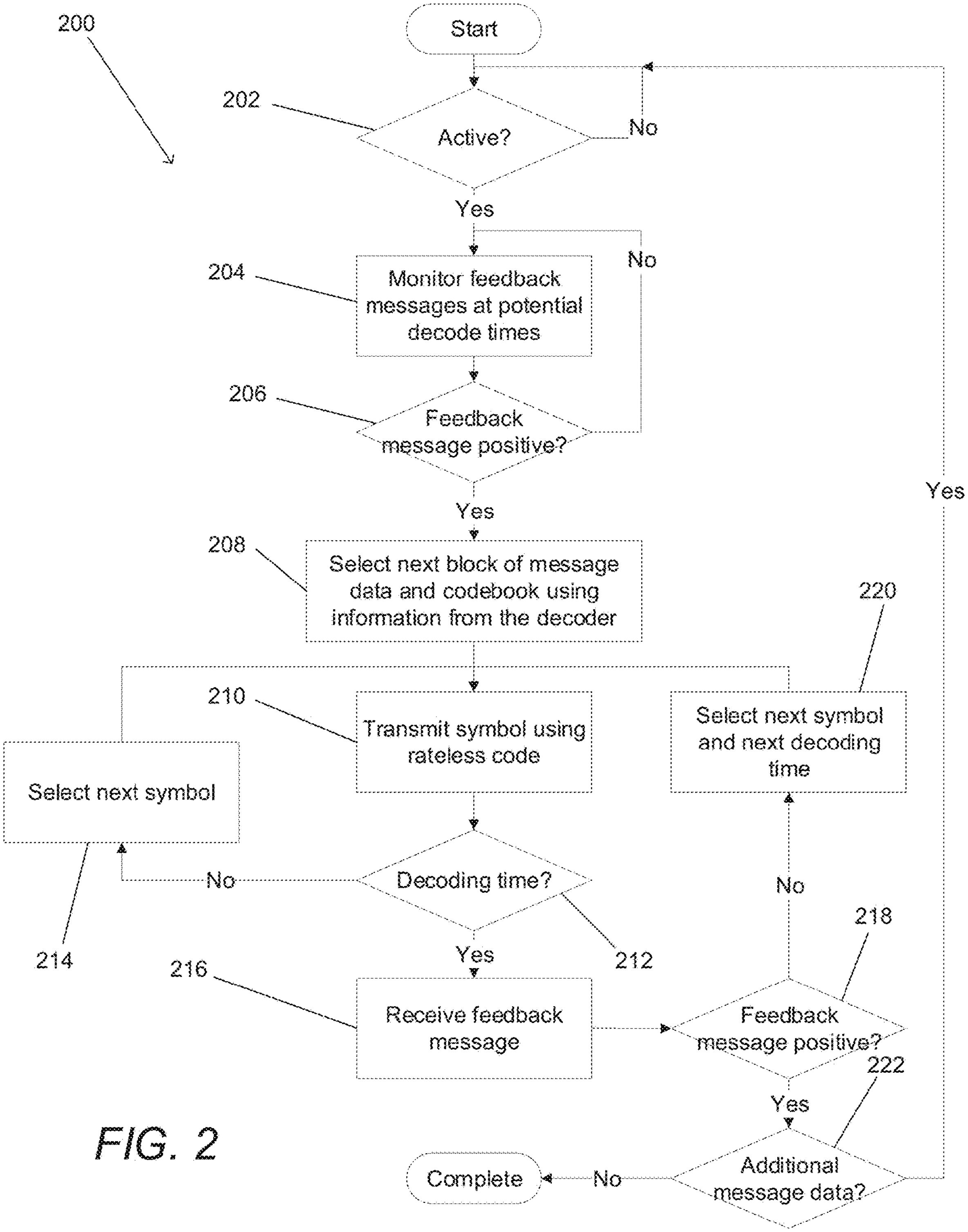
FIG. 2 is a flow chart illustrating a process for transmitting data using a rateless code on a MAC and/or RAC during epochs defined by a receiver in accordance with an embodiment of the invention.

A process for transmitting data using a rateless code on a MAC and/or RAC during epochs defined by a receiver in accordance with an embodiment of the invention is illustrated in FIG. 2. The process 200 involves the transmitter determining 202 whether or not to become active during the next epoch. When the transmitter wishes to transmit, the transmitter commences monitoring 204 a feedback channel to determine 206 whether the receiver has broadcast a positive feedback message indicating the start time of the next epoch. As noted above, in many embodiments of the invention the receiver is limited to only transmitting feedback messages at a set of times (e.g., the set of potential decoding times) that are known to the transmitter. Accordingly, the transmitter may only monitor the feedback channel at those specific set of times until a positive feedback is received.

The transmitter selects 208 a block of message data to transmit and a codebook to use to encode the message data, using a rateless code. In many embodiments, the codebook utilized is a codebook indicated by a receiver that includes codewords in which the codewords are located within a restricted subset of a multi-dimensional sphere. In many embodiments, the codebook constitutes a common randomness between the transmitter and the receiver. In other embodiments, there is only one codebook, and that same codebook is always used to encode the message data using a rateless code. In certain embodiments, the codebook is the same for every transmitter. In many embodiments, the codebook is specific to the transmitter. In order to encode the message data, the transmitter can also reset a clock that is used to count the number of transmitted symbols and a counter that is used to index into the set of potential decoding times. As noted above, in some embodiments, the counter can be considered to correspond to a number of active transmitters.

The transmitter transmits 210 the symbols generated by the rateless code based upon the block of message bits and with each transmitted symbols checks 212 to see whether the number of transmitted symbols corresponds to one of the potential decoding times in the set of potential decoding times. If not, then the transmitter increments 214 the clock. When the number of transmitted symbols corresponds to a potential decoding time from the set of potential decoding times, the transmitter listens 216 for an acknowledgment feedback from the receiver. When a determination 218 is made that the acknowledgment message is a negative feedback message, then the transmitter increments the clock and the counter. The transmitter continues to transmit symbols generated by the rateless code until a determination 218 is made that a positive feedback message is received. At which point the epoch is over and the transmitter determines 222 whether additional message data is available for transmission and 202 whether the transmitter wishes to be active during the next epoch. When no more message data is available for transmission, the process can complete.

Although specific processes for transmitting data are described above with reference to FIG. 2, any of a variety of processes can be utilized to transmit data as appropriate to the requirements of specific applications in accordance with various embodiments of the invention. While various embodiments of the invention are not limited to transmission via the MAC or RAC and can include transmission via point-to-point channels, communication via Gaussian and fading MACs and RACs are particularly interesting applications having the potential to significantly expand the capabilities of conventional communication systems by allowing receivers to receive data from multiple transmitters that are simultaneously transmitting on the same communication channel. Accordingly, processes for receiving and decoding data transmitted by an unknown number of transmitters via MACs and RACs in accordance with a number of embodiments of the invention are discussed below.

Processes for Decoding Data, Transmitted by an Unknown Number of Transmitters Receivers in accordance various embodiments of the invention are configured to receive data transmitted by an unknown number of transmitters and encoded by rateless codes. In some embodiments, these rateless codes are based upon codewords located within a restricted subset of a multi-dimensional sphere. In several embodiments, these rateless codes are fixed. In order to be effective, the receiver must permit the transmitters to transmits symbols for a period of time that is sufficiently long to enable decoding of the transmitted messages with high probability. However, permitting the transmitters to transmit more symbols beyond this required blocklength decreases the rate of the transmitters below capacity of the channel. Accordingly, receivers in accordance with many embodiments of the invention employ decoding rules to determine when a sufficient number of symbols are received to decode the transmitted messages with high probability. In a number of embodiments, a separate potential decoding time is determined for each possible number of active transmitters, and the receiver applies a decoding rule at the each of the potential decoding times to determine whether the transmitted messages can be decoded. In this way, the decoding rule effectively constitutes an attempt to estimate the number of active transmitters. As is discussed below, communication systems in accordance with many embodiments of the invention utilize transmitters that share a common encoder to reduce implementation complexity. In several embodiments, simplicity is traded off for the ability of the receiver to identify the specific messages transmitted by individual transmitters. In a number of embodiments, the receiver can assign a codebook that is specific to a given transmitter to enable identification of the messages transmitted by the transmitter.

The implementation of receivers in accordance with various embodiments of the invention can be influenced by the manner in which the receiver manages the case in which no transmitters are transmitting. The sooner the receiver ends an epoch in which no transmitters are transmitting, the higher the rate achieved across the channel. In a number of embodiments, receivers employ a separate process to determine whether transmitters are active and the receiver simply commences decoding when the receiver knows that transmitters are active. In other embodiments, the receiver incorporates a decoding rule that determines whether any transmitters are active prior to the first potential decoding time period.

Figure 3:
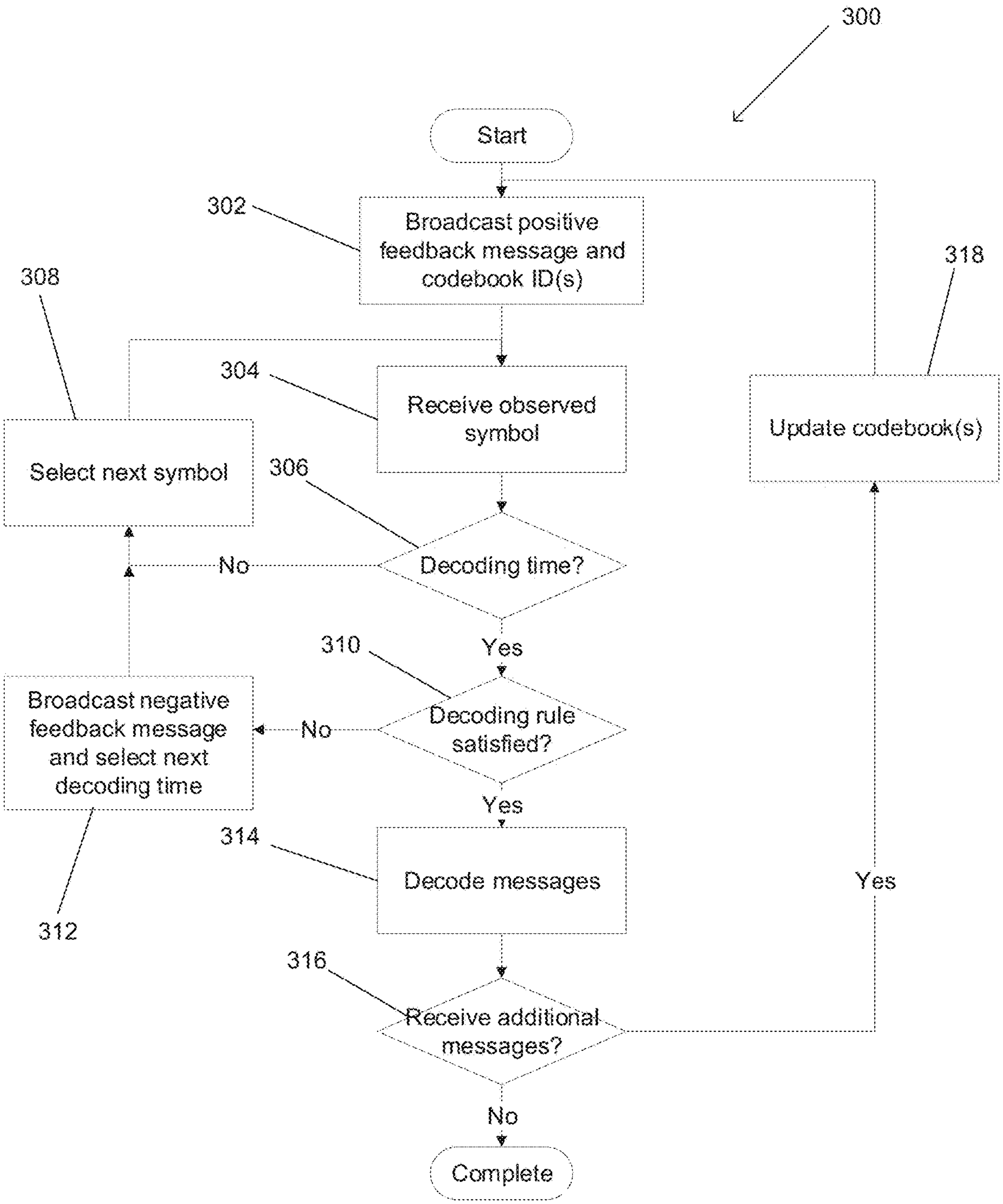
FIG. 3 is a flow chart illustrating a process for detecting whether one or more transmitters are active and/or decoding data transmitted by the one or more active transmitters via a MAC and/or RAC in accordance with an embodiment of the invention.

A process for detecting whether one or more transmitters are active and/or decoding data transmitted by the one or more active transmitters via a MAC and or RAC in accordance with an embodiment of the invention is illustrated in FIG. 3. The process 300 commences when the receiver broadcasts 302 a positive feedback message to the transmitters indicating the commencement of an epoch. The positive feedback message can be accompanied by a message indicating one or more codebooks that should be utilized by one, some, or all of the transmitters to encode message data using rateless codes during the epoch.

As part of a process of receiving and decoding symbols, the receiver can initialize a clock that is used to count the number of received symbols and a counter that is used to index into the set of potential decoding times. As noted above, in some embodiments, the counter can be considered to correspond to a number of active transmitters. When a receiver determines the estimated number of active transmitters, the receiver can transmit a positive feedback message indicating the end of the epoch. In other embodiments, the counter can be considered an index identifying a specific subset of distinct encoders. Where a receiver determines that the counter specifies the estimated set of active transmitters and the time equals the time for decoding that number of active encoders, the receiver will transmit a positive feedback message indicating the end of the epoch.

After the receiver commences receiving observed symbols, the receiver determines 302 whether the number of received symbols corresponds to the potential decoding time indicated by the counter. When the clock indicates that the current time is not one of the potential decoding times, the receiver increments 308 the clock and continues to receive observed symbols. When the clock corresponds to one of the potential decoding times from the set of potential decoding times indicated by the counter, the receiver determines 310 whether a decoding rule is satisfied. The first potential decoding time corresponds to a period of time during which the receiver can determine that there are no transmitters. A variety of different decoding rules can be applied to determine that there are no active transmitters and at subsequent potential decoding times to estimate the number of active transmitters. In many embodiments, the decoding rule that is utilized to estimate the number of active transmitters during the epoch can be a simple threshold rule that is applied at each potential decoding time after a determination is made that one or more transmitters are active. As is discussed further below, the specific decoding rule applied in a given receiver in accordance with an embodiment of the invention is largely dependent upon the requirements of a given application.

When the decoding rule is not satisfied, the receiver concludes that the subset of transmitters indexed by t is not the estimated active transmitter subset that is currently active and sends a negative feedback message to the transmitters. The receiver also increments the counter and the clock and continues to receive observed symbols. When the decoding rule is satisfied, the receiver decodes 314 the messages transmitted by the estimated active transmitter set and broadcasts a positive feedback message to the transmitters. In some embodiments, the receiver can determine 316 whether it is prepared to initiate another epoch. In the event that the receiver wishes to commence another epoch, the receiver selects 318 one or more codebooks to be utilized by the transmitters during the next epoch and broadcasts 302 a positive feedback message to the transmitters indicating the commencement of the next epoch and specifying the chosen codebook ID(s). In the event that the receiver completes an epoch and does not want to initiate a new epoch, the process completes. In many embodiments, the receiver transmits a positive feedback message indicating the end of the epoch (so the transmitters can cease transmission), followed by a message indicating that a new epoch has not commenced.

While a number of specific processes are described above for decoding data transmitted by an unknown number of transmitters via a RAC using rateless codes with reference to FIG. 3, any of a variety of process can be utilized in the decoding of data transmitted by multiple transmitters using rateless codes during epochs having durations determined by a receiver as appropriate to the requirements of specific applications in accordance with various embodiments of the invention. For example, a positive feedback message can indicate both the end of one epoch and the start of another epoch. In many embodiments, the transmitter and receivers commence a new epoch at a fixed time offset from the transmission of a positive feedback message b the receiver. In certain embodiments, the receiver transmits a first positive feedback message to end an epoch and a second message to commence the next epoch. In certain embodiments, the receiver can detect that an unusually large number of transmitters are attempting to transmit and send a feedback message that ends the epoch and that directs one or more of the transmitters to wait a period of time (e.g., a random number of epochs) before attempting to retry transmitting a message. Accordingly, it should be appreciated that receivers in accordance with various embodiments of the invention are not limited to any particular feedback mechanism and/or protocol.

While a variety of communication systems, transmitters, and receivers are described above with reference to FIGS. 2-3, as will be appreciated based upon the discussion below, any of a variety of transmitters and receivers that employ rateless codes can be utilized in accordance with various embodiments of the invention. The discussion that follows presents a variety of approaches that can be utilized to design communication systems and to determine the set of possible decoding tunes to be utilized by the decoder in decoding the messages from the transmitters in a given application. In order to discuss communication systems in accordance with various embodiments of the invention in more detail, it is helpful to define a set of notations that can be helpful in describing the Gaussian MAC and/or RAC and Fading MAC and/or RAC models that can be employed in designing communication systems in accordance with many embodiments of the invention and the resulting communication systems,

Notation

Bold symbols are used to denote vectors (e.g., x). For any integer $k \geq 1$, $[k] \triangleq \{1, \ldots, k\}$. For any set $\mathcal{A}\ \mathcal{P}\ \mathcal{A} \triangleq \mathcal{S} \subseteq \mathcal{A}\ \mathcal{S} \neq\}$denotes the set of non-empty subsets of $\mathcal{A}$. For any $x=(x_1, \ldots, x_n) \in \mathbb{R}^n$ and $\mathcal{N} \subseteq [n]$, $x^{N}=(x_i: i \in \mathcal{N})$ denotes the sub-vector of x with components in $\mathcal{N}$. For vectors $x_1, \ldots, x_K$ of the same dimensions and index set $\mathcal{S} \in \mathcal{P}([K])$, $x_s=(x_s: s \in \mathcal{S})$ and $x_{(s)} \triangleq \Sigma_{s \in S} x_s$. The notation for vectors and their collections is summarized in Table 1 below. For vectors $x=(x_1, \ldots, x_n)$ and $y=(y_1, \ldots, y_n)$ $$x \overset{\pi}{=} y$$

can be written if there exists a permutation π of the elements of y such that $x=\pi(y)$, and $$x \overset{\pi}{\neq} y$$

if $x \neq \pi(y)$ for all permutations π of elements of y. The inner product of x and y is denoted by $$\langle x, y \rangle = \sum_{i=1}^{n} x_i y_i$$

and the Euclidean norm of x by $\|x\| \triangleq =\sqrt{(x,x)}$. Vector inequalities are understood element-wise, i.e., $x \geq y$ if and only if $x_i \leq y_i$ for all $i \in [n]$. All-zero and all-one vectors are denoted by 0 and 1, respectively.

Matrices are denoted by sans serif font (e.g., A), The n×n matrix is denoted by $I_n$. Logarithms and exponents are base e. The indicator function is denoted by $1\{\cdot\}$. Unless specified otherwise, for any scalar function $f(\cdot)$ and any vector $x \in \mathbb{R}^n$, the vector of function values $f(x)=(f(x_i): i \in [n])$ is formed. For a set $\mathcal{D} \subseteq \mathbb{R}^n$, a vector $c \in \mathbb{R}^n$, and a scalar α, $\alpha\mathcal{D}+c \triangleq \{\alpha x+c: x \in \mathcal{D}\}$. The sphere with dimension n, radius r, and center at the origin is denoted by $\mathbb{S}^n(r) \triangleq \{x \in \mathbb{R}^n: \|x\|=r\}$.

The distribution of a random variable X is denoted by $P_X$. $P_X \to P_{Y|X} \to P_Y$ indicates that $P_Y$ is the marginal distribution of $P_X P_{Y|X}$. To indicate that the random variables (or vectors) X and Y are identically distributed, the notation X~Y is employed. The multivariate Gaussian distribution with mean μ and covariance matrix Σ is denoted by $\mathcal{N}(\mu, \Sigma)$. The complementary Gaussian cumulative distribution function $$Q(x) = \frac{1}{\sqrt{2\pi}} \int_x^{\infty} \exp\left\{-\frac{t^2}{2}\right\} dt$$

is employed, Furthermore, the functional inverse of $Q(\cdot)$ is denoted by $Q^{-1}(\cdot)$.

Big-O notation $f(n)=O(g(n))$ is used if and only if there exist constants c and $n_0$ such that $|f(n)| \leq c|g(n)|$for al $n>n_0$; little-o notation $f(n)=o(g(n))$ is used if and only if for every $\epsilon>0$, there exists a constant $n_0$ such that $|f(n)| \leq \epsilon|g(n)|$ for all $n>n_0$.

TABLE 1

| Vector Notation | | |
|---|---|---|
| Notation | Linear form | Description |
| $x_s$ | $(x_{s,1}, \ldots, x_{s,n})$ | The length-n vector that is a member of a collection indexed by s ∈ S |
| $x_S$ | $(x_S: s \in S)$ | The size-\|S\| ordered collection of length-n vectors |

TABLE 1-continued

| Vector Notation | | |
|---|---|---|
| Notation | Linear form | Description |
| $x_S^N$ | $((x_{s,t} : t \in N): s \in S)$ | The size-\|S\| ordered collection of length-\|N\| vectors with time indices in $N \subseteq [n]$ |
| $x_{(S)}$ | $\Sigma_{s \in S}\, x_s$ | Summation of length-n vectors from the collection S |

System and Methods for Communicating Via a Gaussian Multiple Access Channel

Systems and methods in accordance with many embodiments of the invention utilize a two-transmitter MAC channel code. In several embodiments, an $(M_1, M_2, \gamma)$-MAC code for the channel with transition law $P_{Y_2|X_1X_2}$ can be used that includes two encoding functions $$\frac{1}{M_1M_2}\sum_{m_1=1}^{M_1}\sum_{m_2=1}^{M_2}\mathbb{P}[g(Y_2) \neq (m_1, m_2)|(X_1, X_2) = (f_1(m_1), f_2(m_2))] \leq \epsilon, \tag{4}$$

where $Y_2$ is the channel output under inputs $X_1$ and $X_2$, and $\epsilon$ is the average-error constraint.

The mutual information densities for a MAC with channel transition law $P_{Y_2|X_1X_2}$ can be defined as $$i_1(x_1; y|x_2) \triangleq \log\frac{P_{Y_2|X_1X_2}(y|x_1, x_2)}{P_{Y_2|X_2}(y|x_2)} \tag{5a}$$

$$i_2(x_2; y|x_1) \triangleq \log\frac{P_{Y_2|X_1X_2}(y|x_1, x_2)}{P_{Y_2|X_1}(y|x_1)} \tag{5b}$$

$$i_{1,2}(x_1, x_2; y) \triangleq \log\frac{P_{Y_2|X_1X_2}(y|x_1, x_2)}{P_{Y_2}(y)}, \tag{5c}$$

where $P_{X_1}$ and $P_{X_2}$ are the channel input distributions, and $P_{X_1}P_{X_2} \rightarrow P_{Y_2X_1X_2} \rightarrow P_{Y_2}$. The mutual information random vector is defined as $$i_2 \triangleq \begin{bmatrix} i_1(X_1; Y_2|X_2) \\ i_2(X_2; Y_2|X_1) \\ i_{1,2}(X_1, X_2; Y_2) \end{bmatrix}, \tag{6}$$

where $(X_1, X_2, Y_2)$ is distributed according to $P_{X_1}P_{X_2}P_{Y_2|X_1X_2}$.

The performance of the above codes on the Gaussian MAC, can be analyzed using a Random Coding Union (RCU) bound with $P_{X_1}$ and $P_{X_2}$ uniform on the power spheres.

Random Coding Union Bound for the Multiple Access Channel

When the input distributions $P_{X_1}$ and $P_{X_2}$ are fixed, $P_{X_1x\bar{X}_1X_2\bar{X}_2Y_2}(x_1, \bar{x}_1, x_2, \bar{x}_2, y)=P_{X_1}(x_1)P_{X_1}(\bar{x}_1)P_{X_2}(x_2)P_{X_2}(\bar{x}_2)P_{Y_2|X_1X_2}(y|x_1,x_2)$. Furthermore, there exists a, $(M_1, M_2, \epsilon)$–MAC code for $P_{Y_x|X_1X_2}$ such that $$\epsilon \geq \mathbb{E}[\min\{1, (M_1-1)\mathbb{P}[i_1(\bar{X}_1; Y_2|X_2) \geq i_1(X_1; Y_2|X_2)|X_1, X_2, Y_2]+(M_2-1)\mathbb{P}[i_1(\bar{X}_2; Y_2|X_1) \geq i_2(X_2; Y_2|X_1)|X_1, X_2, Y_2]+(M_1-1)(M_2-1)\mathbb{P}[i_{1,2}(\bar{X}_1, \bar{X}_2; Y_2) \geq i_{1,2}(X_1, X_2; Y_2)|X_1, X_2, Y_2]\}]. \tag{7}$$

When the codewords $X_1(m_1)$, $m_1 \in [M_1]$ and $X_2(m_2)$, $m_2 \in [M_2]$ are drawn i.i.d. from $P_{X^1}$ and $P_{X_2}$, respectively, and independently of each other, a maximum likelihood decoder at the receiver can choose the message pair $(m_1, m_2)$ with the maximum information density $i_{1,2}(X_1)(m_1), X_2(m_2); Y_2)$. In this circumstance, the average probability of error can be bounded from above as $$\epsilon \leq \mathbb{P}\left[\bigcup_{(j,k)\neq(1,1)}\{i_{1,2}(X_1(j), X_2(k); Y_2) \geq i_{1,2}(X_1(1), X_2(1); Y_2)\}|(X_1, X_2) = (X_1(1), X_2(1))\right] \tag{8}$$

$$= \mathbb{E}\left[\mathbb{P}\left[\bigcup_{(j,k)\neq(1,1)}\{i_{1,2}(X_1(j), X_2(k); Y_2) \geq i_{1,2}(X_1(1), X_2(1); Y_2)\}|(X_1(1), X_2(1), Y_2]\right]\right] \tag{9}$$

$$\begin{aligned} \leq \mathbb{E}[\min\{1, &(M_1-1)[i_{1,2}(\overline{X}_1, X_2; Y_2) \geq i_{1,2}(X_1, X_2; Y_2)|X_1, X_2, Y_2] \\ &+(M_2-1)\mathbb{P}[i_{1,2}(X_1, \overline{X}_2; Y_2) \geq i_{1,2}(X_1, X_2; Y_2)|X_1, X_2, Y_2] \\ &+(M_1-1)(M_2-1)\mathbb{P}[i_{1,2}(\overline{X}_1, \overline{X}_2; Y_2) \geq i_{1,2}(X_1, X_2; Y_2)|X_1, X_2, Y_2]\}], \end{aligned} \tag{10}$$

where (10) follows the union bound and the bounded nature of probability. The right-hand side of (10) is equal to the right-hand side of (7), since the mutual information density $i_{1,2}(x_1, x_2; y)$ can be expanded as $$i_{1,2}(x_1, x_2; y) = i_1(x_1; y|x_2) + i_2(x_2; y) \quad i_2(x_2; y|x_1) + i_1(x_1; y), \tag{11}$$

where $$i_i(x_i; y) \triangleq \log\frac{P_{Y_2|X_i}(y|x_i)}{P_{Y_2}(y)},$$

$i \in \{1,2\}$. Since the average error probability of randomly generated codewords is bounded by the right-hand side of (7), there exists a code satisfying (7).

In several embodiments of the invention, the system utilizes a MAC code with with an arbitrary $K \geq 2$ transmitters. In these embodiments, an $(M_{[K]}, \epsilon)$-MAC code for the channel with transition law $P_{Y_K|X_{[K]}}$ is used that includes K encoding functions, $f_i$: $[M_i] \rightarrow X_i$, $i \in [K]$, and a decoding function g:

$$\mathcal{Y}_K \rightarrow \mathop{\times}_{i=1}^{K}[M_i]$$

such that $$\frac{1}{\prod_{i=1}^{K}M_i}\sum_{m_{[K]}\in \times_{i=1}^{K}[M_i]}\mathbb{P}[g(Y_K) \neq m_{[K]}|X_{[K]} = f_{[K]}(m_{[K]})] \leq \epsilon, \tag{12}$$

where $Y_K$ is the channel output under inputs $X_1, \ldots X_K$, and $\epsilon$ is the average-error constraint. The above result generalizes to the K-transmitter MAC. The conditional mutual information densities can be defined for the K-transmitter MAC as $$i_{\mathcal{S}}(x_{\mathcal{S}}; y|x_{\mathcal{S}^c}) \triangleq \log \frac{P_{Y_K|X_{[K]}}(y|x_{[K]})}{P_{Y_K|X_{\mathcal{S}^c}}(y|x_{\mathcal{S}^c})}, \tag{13}$$

where $\mathcal{S} \subset [K]$, $\mathcal{S} \neq$, and $\mathcal{S}^c[K]\backslash\mathcal{S}$, and the unconditional mutual information density as $$i_{[K]}(x_{[K]}; y) \triangleq \log \frac{P_{Y_K|X_{[K]}}(y|x_{[K]})}{P_{Y_K}(y)}. \tag{14}$$

The inequality in (7) extends to the K-transmitter MAC as $$\epsilon \leq \mathbb{E}\left[\min\left\{1, \sum_{\mathcal{S}\in\mathcal{P}([K])}\left(\prod_{s\in\mathcal{S}}(M_s - 1)\right)\mathbb{P}\left(i_{\mathcal{S}}\left(\overline{X}_{\mathcal{S}}; Y_K|X_{\mathcal{S}^c}\right)\right.\right.\right. . \tag{15}$$
$$\geq i_{\mathcal{S}}(X_{\mathcal{S}}; Y_K|X_{\mathcal{S}^c})|X_{[K]}, Y_K]\}]$$

A Third-order Achievability Bound for the Gaussian MAC

In several embodiments, the code definition incorporates maximal-power constraints ($P_1$, $P_2$) on the channel inputs. When ($X_1$, $X_2$) and $Y_2$ are defined as the MAC inputs and output, respectively, an (n, $M_1$, $M_2$, $\epsilon$, $P_1$, $P_2$)-MAC code for a two-transmitter MAC includes encoding functions $f_1$: $[M_1]\rightarrow\mathbb{R}^n$ and $f_2$: $[M_2]\rightarrow\mathbb{R}^n$, and decoding function g: $\mathbb{R}^n\rightarrow[M_1]\times[M_2]$ such that $$\|f_i(m_i\|^2 \leq nP_i \quad \forall\, i \in \{1, 2\},\quad m_i \in [M_i]$$
$$\frac{1}{M_1M_2}\sum_{m_1=1}^{M_1}\sum_{m_2=1}^{M_2}\mathbb{P}[g(Y_2) \neq (m_1, m_2)| \quad .$$
$$(X_1, X_2) = (f_1(m_1), f_2(m_2))] \leq \epsilon$$

The following notation can be used to present an achievability result for the Gaussian MAC with k≥1 transmitters. Over n channel uses, the channel has inputs $X_1, \ldots, X_k \in \mathbb{R}^n$, additive noise $Z \neq \mathcal{N}(0, I_n)$, and output $$Y_l = X_{\langle[k]\rangle} + Z. \tag{16}$$

The channel transition law induced by (16) can be written as $$P_{Y_k|X_{[k]}}(y|x_{[k]}) = \prod_{i=1}^{n} P_{Y_k|X_{[k]}}(y_i|x_{1i}, \ldots, x_{ki}), \tag{17}$$

where $$P_{Y_k|X_{[k]}}(y|x_{[k]}) = \frac{1}{\sqrt{2\pi}}\exp\left\{-\frac{(y - x_{\langle[k]\rangle})^2}{2}\right\}. \tag{18}$$

When $Z \neq \mathcal{N}(0, V)$, and V is a d×d positive semi -definite matrix, the multidimensional analogue of the inverse $Q^{-1}(\cdot)$ of the complementary Gaussian cumulative distribution is $$Q_{inv}(V, \epsilon) = \{z \in \mathbb{R}^d : \mathbb{P}[Z \leq z] \geq 1 - \epsilon\}. \tag{19}$$

For d=1, $Q^{-1}(\epsilon) = \min\{z : z \in Q_{inv}(1, \epsilon)\}$.

The capacity vector for the two-transmitter GGaussian MAC can be defined as $$C(P_1, P_2) \triangleq \begin{bmatrix} C(P_1) \\ C(P_2) \\ C(P_{\langle[2]\rangle}) \end{bmatrix}. \tag{20}$$

The dispersion matrix for the two-transmitter Gaussian MAC can be defined as $$V(P_1, P_2) \triangleq \begin{bmatrix} V(P_1) & V_{1,2}(P_1, P_2) & V_{1,12}(P_1, P_2) \\ V_{1,2}(P_1, P_2) & V(P_2) & V_{2,12}(P_1, P_2) \\ V_{1,12}(P_1, P_2) & V_{2,12}(P_1, P_2) & V(P_{\langle[2]\rangle}) + V_{12}(P_1, P_2) \end{bmatrix} \tag{21}$$

where V(P) is the dispersion function (3), and $$V_{1,2}(P_1, P_2) = \frac{1}{2}\frac{P_1, P_2}{(1 + P_1)(1 + P_2)} \tag{22}$$

$$V_{i,12}(P_1, P_2) = \frac{1}{2}\frac{P_i(2 + P_{\langle[2]\rangle})}{(1 + P_i)(1 + P_{\langle[2]\rangle})},\ i \in \{1, 2\} \tag{23}$$

$$V_{12}(P_1, P_2) = \frac{P_1, P_2}{(1 + P_{\langle[2]\rangle})^2}. \tag{24}$$

For any $\epsilon \in (0, 1)$ and any $P_1, P_2 > 0$, an (n, $M_1$, $M_2$, $\epsilon$, $P_1$, $P_2$)-MAC code for the two-transmitter Gaussian MAC exists provided that $$\begin{bmatrix} \log M_1 \\ \log M_2 \\ \log M_1M_2 \end{bmatrix} \in nC(P_1, P_2) - \sqrt{n}\,Q_{inv}(V(P_1, P_2), \epsilon) \tag{25}$$
$$+\frac{1}{2}\log n1 + O(1)1.$$

The above result extends to the general K-transmitter Gaussian MAC. An n, $M_{[K]}$, $\epsilon$, $P_{[K]}$)-MAC code for the K-transmitter Gaussian MAC with message set sizes $M_1, \ldots, M_K$ and power constraints $P_1, \ldots, P_K$ is a natural extension of the two-transmitter MAC code given above. For any $\epsilon \in (0, 1)$ , and $P_i > 0$, $i \in [K]$, an (n, $M_{[K]}$, $\epsilon$, $P_{[K]}$)-MAC code for the K-transmitter Gaussian MAC exists provided that $$\left(\sum_{s\in\mathcal{S}}\log M_s : \mathcal{S} \in \mathcal{P}([K])\right) \in nC(P_{[K]}) \tag{26}$$
$$-\sqrt{n}\,Q_{inv}(V(P_{[K]}), \epsilon) + \frac{1}{2}\log n1 + O(1)1,$$

where $C(P_{[K]})$ is the capacity vector $$X(P_{[K]}) \triangleq (C(P_{\langle S\rangle}) : \mathcal{S} \in \mathcal{P}([K])) \in \mathbb{R}^{2^K-1}, \tag{27}$$

and $V(P_{[K]})$ is the $(2^K-1)\times(2^K-1)$ dispersion matrix with the elements $V_{S_1,S_2}(P_{[K]})$, $\mathcal{S}_1, \mathcal{S}_2 \in \mathcal{P}([K])$, given by $$V_{\mathcal{S}_1,\mathcal{S}_2}(P_{[K]}) \tag{28}$$
$$\triangleq \frac{P_{\langle\mathcal{S}_1\rangle}P_{\langle\mathcal{S}_2\rangle} + 2P_{\langle\mathcal{S}_1\cap\mathcal{S}_2\rangle} + \left(P_{\langle\mathcal{S}_1\cap\mathcal{S}_2\rangle}\right)^2 - P^2_{\langle\mathcal{S}_1\cap\mathcal{S}_2\rangle}}{2\left(1 + P_{\langle\mathcal{S}_1\rangle}\right)\left(1 + P_{\langle\mathcal{S}_2\rangle}\right)}.$$

For the symmetric setting, that is $P_i=P$ and $M_i=M$ for $i\in[K]$, for any $\epsilon\in(0, 1)$, and $P>0$, an (n, M1, $\epsilon$P1)-MAC code for the K-transmitter Gaussian MAC exists provided that $$K\log M \le nC(KP) - \sqrt{n(V(KP)+V_{cr}(K,P))}\,Q^{-1}(\epsilon) + \frac{1}{2}\log n + O(1). \quad (29)$$

Again, C(·) and V(·) are the capacity (1) and dispersion (3) functions, respectively, and $V_{cr}(K,P)$ is the cross dispersion term $$V_{cr}(K,P) \triangleq \frac{K(K-1)P^2}{2(1+KP)^2}. \quad (30)$$

Communications Systems for Communicating via Gaussian Random Access Channels

In order to capture the scenario of a memoryless Gaussian channel with K possible transmitters, a single receiver, and an unknown activity pattern $\mathcal{A}\subseteq[K]$ describing the set of active transmitters, the Gaussian RAC can be described by a family of Gaussian MACs $\{P_{Y_k|X_{[k]}}\}_{k=0}^{K}$, each indexed by the number of active transmitters $k\in\{0, \ldots, K\}$. A compound channel model can be utilized to avoid the need to assign probabilities to each activity pattern $\mathcal{A}$. In other embodiments, the system designer assigns a prior probability of being active or other forms of priorities to each activity pattern $\mathcal{A}$.

Systems and methods in accordance with many embodiments of the invention utilize an epoch-based rateless communication strategy to achieve the fundamental limits of the Gaussian RAC. Each transmitter can either be active or silent during a whole epoch. At each of times $n_0, n_1, \ldots,$ the decoder broadcasts to all transmitters a message indicating whether the decoder has been able to decode the messages or not (e.g., a single bit or symbol-sending value 1 if it can decode and 0 otherwise). The transmission of a message (e.g., a one bit message '1') at time $n_t$ ends the current epoch and starts the next. The timing of the end of the epoch is often indicative of the decoder's estimate that the number of transmitters is t.

In several embodiments, identical encoding is employed in which each active transmitter i uses the same encoding function to describe its message $W_i\in[M]$. Identical encoding here assumes $P_i=P$ and $M_i=M$ for all i. The task of the decoder is to decode a list of messages sent by the active transmitters $\mathcal{A}$ but not the identities of those transmitters. Messages $W_A$ are independent and uniformly distributed on alphabet [M].

Since encoding is identical and the channel is invariant to permutation of its inputs, it can be assumed without loss of generality that $|\mathcal{A}|=k$ implies $\mathcal{A}=[k]$. Intuitively, given identical encoding and a Gaussian channel, one would expect that interference increases with the number of active transmitters k, and therefore that the decoding time $n_k$ increases with k. Since the capacity per transmitter for the k-transmitter Gaussian MAC, $$\frac{1}{k}C(kP),$$

decreases with k, $n_0<\ldots<n_K$ for M can be chosen to be large enough. In several embodiments, the system designer can choose a different ordering on the decoding times $n_0, \ldots, n_K$.

As a notational convenience, $n_K$ can be used to represent the longest decoding time. At time $n_K$, the decoder sees $$Y_l=X_{(|k|)}+Z\in\mathbb{R}^{n_K} \text{ for } k\in[K], \quad (31)$$

where $X_1, \ldots, X_k$ are $n_K$-dimensional channel inputs, $Z\sim\mathcal{N}(0, 1_{n_K})$ is the Gaussian noise, and $Y_k$ is the $n_K$-dimensional output when k transmitters are active. When no transmitters are active, $Y_0=Z$. At each time $n_t<n_K$, the decoder has access to the first $n_t$ dimensions of $Y_k$.

An agnostic random access model can be assumed, where the transmitters know nothing about the set $\mathcal{A}$ of active transmitters except their own membership and the feedback from the receiver. The receiver knows nothing about $\mathcal{A}$ except what it can learn from the channel output $Y_k$.

In certain embodiments, the transmitters and the receiver utilize a rateless Gaussian RAC code that is an $(\{n_j, \epsilon_j\}_{j=0}^{K}$, M, P)-RAC code for the Gaussian RAC with K transmitters. Such a code can be implemented using a single encoding function $f: \mathcal{U}\times[M]\to\mathbb{R}^{n_K}$ and decoding functions $g_k: \mathcal{U}\times\mathbb{R}^{n_k}\to[M]^k\cup\{e\}$ for k=0, ..., K. The decoder can output the erasure symbol "e" and broadcasts value 0 to the transmitters if it cannot decode at time $n_k$.

The codewords satisfy the maximal-power constraints $$\|f(u,m)^{[n_j]}\|^2\le n_jP \text{ for } m\in[M],\ u\in\mathcal{U},\ j\in[K]. \quad (32)$$

If k transmitters are active, then the average probability of error in decoding k messages at time $n_k$ is bounded as $$\frac{1}{M^k}\sum_{m_{|k)}\in[M]^k}\mathbb{P}\left[\left\{\bigcup_{t:n_t\le n_k, t\ne k}\left\{g_t\left(U, Y_k^{[n_t]}\right)\ne e\right\}\right\}\cup \left\{g_k\left(U, Y_k^{[n_k]}\right)\overset{\pi}{\ne} m_{[k]}\right\}\middle| X_{[k]}^{[n_k]}=f(U, m_{[k]})^{[n_k]}\right]\le\epsilon_k, \quad (33)$$

where $f(U, m_i)$ is the codeword for the message $m_i\in[M]$, U is the common randomness randon variable and the output $Y_k$ is generated according to (31). If no transmitters are active, then the decoder decodes to the unique message {1} with probability of error bounded as $$\mathbb{P}[g_0(U, Y_0^{[n_0]})\ne 1]\le\epsilon_0. \quad (34)$$

The realization u, of the common randomness random variable U initializes the encoders and the decoder. At the start of each communication epoch, u can be shared between all transmitters and the receiver. The alphabet size of U is bounded by K+1.

A Third-Order Achievability Result for the Gaussian RAC

When $K<\infty$, $\epsilon_k\in(0, 1)$ for $k\in\{0\}\cup[K]$, and M are fixed, an $(\{n_j, \epsilon_j\}_{j=0}^{K}$, M, P)-RAC code exists for the Gaussian RAC with K possible transmitters provided that $$k\log M\le n_kC(kP)-\sqrt{n_k(V(kP)+V_{cr}(k,P))}\,Q^{-1}(\epsilon_k)+\frac{1}{2}\log n_k+O(1) \quad (35)$$

for $k\in[K]$, and $$n_0\ge c\log n_1+o(\log n_1) \quad (36)$$

for some constant c>0, where $C(\cdot)$, $V(\cdot)$, and $V_{cr}(\cdot, \cdot)$ the capacity (1) dispersion (3), and cross dispersion functions (30), respectively. All uses of O(1) and o(1) are taken with. respect to $n_1$.

When constants $\lambda_k>0$ for $k \in \{0\}$ [K] and distribution $P_X$ on $\mathbb{R}^{n_K}$ are fixed, there exists an $(\{n_j, \epsilon_j\}_{j=0}^{K}, M, P)$-RAC code with $$\epsilon_0 \leq \mathbb{P}\left[\left|\left\|Y_0^{[n_0]}\right\|^2 - n_0\right| > n_0\lambda_0\right] \tag{37}$$

$$\epsilon_k \leq \frac{k(k-1)}{2M} + \mathbb{P}\left[\bigcup_{i=1}^{k} \bigcup_{\substack{j:n_j \leq n_k \\ j \geq 1}} \left\{\left\|X_i^{[n_j]}\right\|^2 > n_j P\right\}\right] \tag{38a}$$

$$+\mathbb{P}\left[\bigcup_{\substack{t:n_t \leq n_k \\ t \neq k}} \left\{\left|\left\|Y_k^{[n_t]}\right\|^2 - n_t(1+tP)\right| \leq n_t\lambda_t\right\}\right.$$

$$\left.\bigcup\left\{\left|\left\|Y_k^{[n_k]}\right\|^2 - n_k(1+kP)\right| > n_k\lambda_k\right\}\right] \tag{38b}$$

$$+\mathbb{E}\left[\min\left\{1, \sum_{s=1}^{k}\binom{k}{s}\binom{M-k}{s}\right.\right.$$

$$\mathbb{P}\left[i_{[s]}\left(\overline{X}_{[s]}^{[n_k]}; Y_k^{[n_k]}\middle|X_{[s+1;k]}^{[n_k]}\right)\right. \tag{38c}$$

$$\left.\left.\left.\geq i_{[s]}\left(X_{[s]}^{[n_k]}; Y_k^{[n_k]}\middle|X_{[s+1;k]}^{[n_k]}\right)\middle|X_{[k]}^{[n_k]}, Y_k^{[n_k]}\right]\right\}\right]$$

for all $k \in [K]$, where $X_{[K]}, \overline{X}_{[K]}, Y_K \in \mathbb{R}^{n_K}$ are distributed according to $P_{X_{[K]}, \overline{X}_{[K]}, Y_K}(x_{[K]}, \overline{x}_{[K]}, y_k) = (\Pi_{j \in [K]} p_X(x_j) P_X(\overline{x}_j)) P_{Y_k|X_{[k]}}(y_k|x_{[k]})$, and $P_{Y_k|X_{[k]}}$ is given in (31). The terms in (38a) correspond to the probability that at least two transmitters send the same message, and the probability of a power constraint violation, respectively. The probability in (38b) corresponds to the probability that the decoder decodes at a wrong decoding time, and the expectation in (38c) corresponds to the probability that the decoder decodes an incorrect message list at the correct decoding time $n_k$ for k active transmitters.

For the Gaussian RAC, the rateless code described above performs as well in the first-, second-, and third-order terms as the best known communication scheme when the set of active transmitters is known. In other words, the first three terms on the right-hand side of (35) for k active transmitters match the first three terms of the largest achievable sum-rate in our achievability bound in (29) for the k-transmitter MAC.

When the distribution of the random codewords $P_X$ is particularized such that the first $n_1$ symbols are drawn uniformly from the $n_1$-dimensional sphere with radius $\sqrt{n_1 p}$, $\mathbb{S}^{n_1}(\sqrt{m_1 P})$, the symbols indexed from to $n_{j-1}+1$ to $n_j$ are drawn uniformly from $\mathbb{S}^{n_j - n_{j-1}}(\sqrt{(n_j - n_{j-1})P})$ for j=2, . . . , K, and these K spherically distributed sub-codewords are independent. Under this $P_X$, the maximal-power constraint in (32) is satisfied with equality for each number of active transmitters. Rather than using an encoding function that depends on the feedback from the receiver to the transmitters, systems and methods in accordance with many embodiments of the invention use an encoding function that is suitable for all possible transmitter activity patterns and does not depend on the receiver's feedback. Give that a decision is made at time $n_k$, the active transmitters have transmitted only the first $n_k$ symbols of the codewords representing their messages during that epoch, and the remaining $n_K - n_k$ symbols of the codewords are not used.

In many embodiments including the one that the sub-codewords are drawn independently and uniformly from the surface of multi-dimensional spheres with potentially different sizes, the number of active transmitters in a Gaussian RAC can be reliably estimated from the total received power. This is possible because when k transmitters are active, the average received power $$\frac{1}{n_k}\mathbb{E}\left[\left\|Y_k^{[n_k]}\right\|^2\right]$$

at time $n_k$, concentrates around its mean value, N+kP, where N is the noise power of the channel, and this mean is distinct for each $k \in \{0\} \cup [K]$. In other embodiments including the ones that the sub-codewords are drawn dependently, some other suitable functions of the received output $Y_k^{[n_k]}$ can be used to estimate the number of active transmitters. In several embodiments, the decoding function used at time $n_k$ combines the maximum likelihood decoding rule for the k-transmitter MAC with a typicality rule based on the power of the output. If the average received power at time $n_k$ lies on a small interval around N+kP, the decoder can run the maximum likelihood decoding rule, decodes a list of k messages, and broadcasts value '1' to all transmitters; otherwise the decoder does not decode at time $n_k$, broadcasting value '0' to the transmitters and informing them that they must keep transmitting until the next decoding time.

By choosing $n_1, \ldots, n_K$ such that the inequalities in (35) are satisfied with a constant gap for each k, each $n_k$ can be expressed in terms of $n_1, \epsilon_1, \epsilon_k$, k, and P as $$n_k = n_1\frac{kC_1}{C_k} + \sqrt{n_1}\left(\frac{1}{C_k}\sqrt{\frac{kC_1V_k}{C_k}}Q^{-1}(\epsilon_k) - \frac{1}{C_k}\sqrt{kV_1}Q^{-1}(\epsilon_1)\right) + \frac{k-1}{2}\log n_1 + O(1), \tag{39}$$

where $C_k = C(kP)$ and $V_k = V(kP) + V_{cr}(k, P)$. Equation (39) can be dervied by replacing the inequality in (35) by an equality, computing the Taylor series expansion of $n_k$, in (35) in terms of k, P, $\epsilon_k$, and log M, and then replacing log M by (35) for k=1.

The input distribution used for the Gaussian RAC can also be used to achieve equivalent performance to that which can be achieved for the K-transmit ter Gaussian MAC. As long as $n_j - n_{j-1} \geq c n_K$ holds for some constant c>0 for all $j \in [K]$, requiring separate power constraints on each sub-block of the codewords as $$\|f_i(m_i)^{[n_j]}\|^2 \leq n_j P_i \text{ for } m_i \in [M_i],\ i \in [K], j \in [K] \tag{40}$$

does not degrade performance in terms of the first three terms in the expansion of the performance bound. The supports of the distributions from which the codewords are drawn for the Gaussian MAC and RAC are illustrated in FIG. 4 for a small blocklength ($n_K=3$, K=2).

Figure 4:
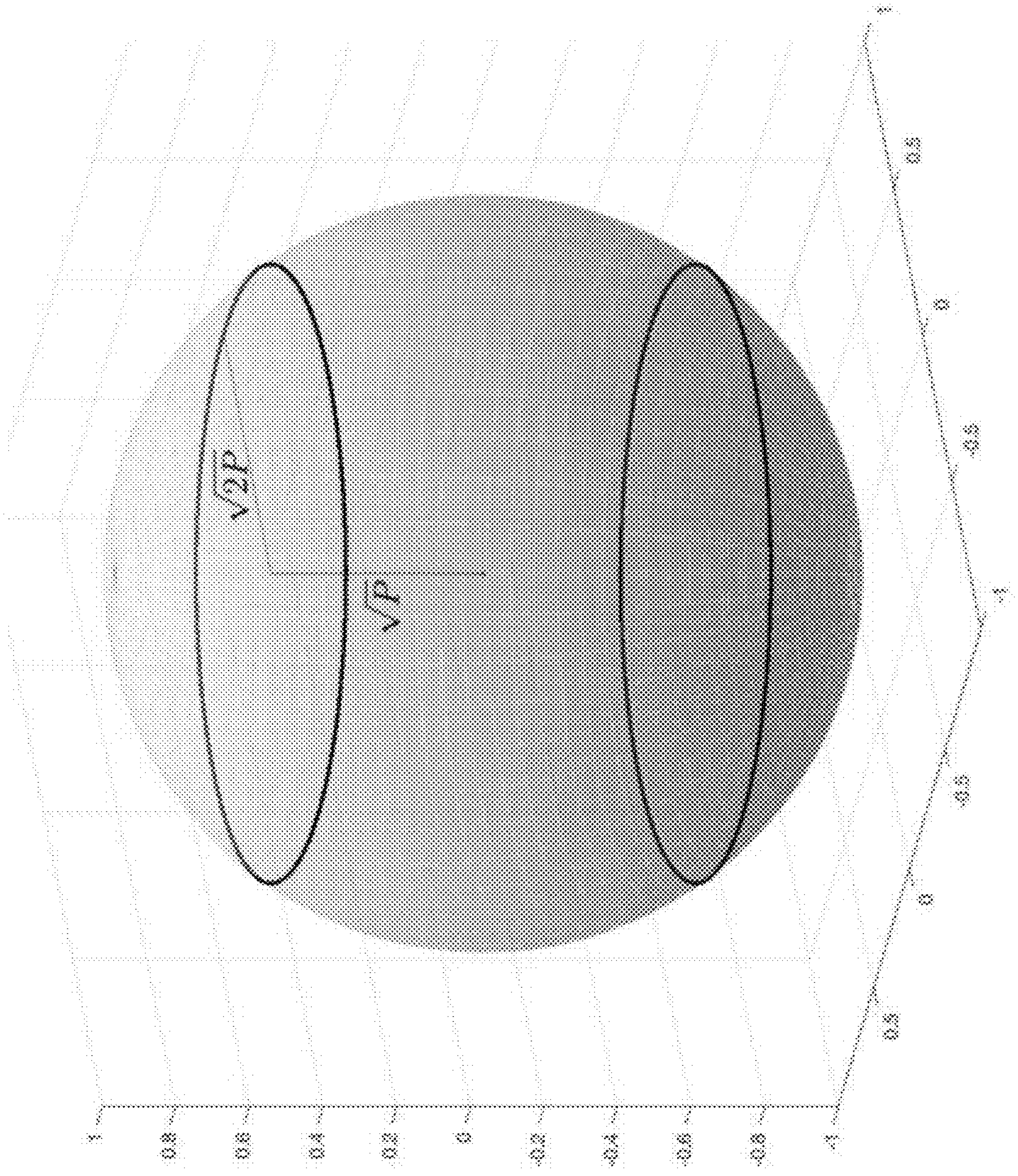
FIG. 4 conceptually illustrates the restricted subset of the surface of a multi-dimensional sphere that the codewords lie on in accordance with an embodiment of the invention.

FIG. 4 conceptually illustrates that the support of the input distribution for the Gaussian RAC is the Cartesian product of $\mathbb{S}^{n_1}(\sqrt{n_1 P})$ (here a circle with radius $\sqrt{\mathbf{2}P}$) and $\mathbb{S}^{n_2 - n_1}(\sqrt{(n_2 - n_1 P)})$ (here the set $\{-\sqrt{P}, \sqrt{P}\}$.) This set is a subset of $\mathbb{S}^{n_2}(\sqrt{n_2 P})$.

As described above, the number of active transmitters in an epoch is estimated via a sequence of decodability tests. An alternative strategy that is utilized in many embodiments is to estimate the number of active transmitters in one shot from the received power at time $n_0$, and to inform the transmitters about the estimate t of the number of active transmitters via a $\lceil\log(K+1)\rceil$-bit feedback at time $n_0$. Given this knowledge, the transmitters can modify their encoding function based on t.

While much of the discussion above assumes that each of the transmitters utilize the same codebook. Systems and methods in accordance with a number of embodiments of the invention have the ability to use codetsooks that are unique to each transmitter. By using distinct codebooks for each transmitter, the decoder can associate the transmitter identities with the decoded messages.

Systems and Methods for Communicating via the Quasi-Static Fading RAC

Multi-transmitter communication over a slowly-varying fading RAC can be considered as a delay-constrained communication, where the duration of a communication epoch is shorter than the channel's coherence time, so the random fading coefficient stays constant during the entire epoch. This channel model is commonly referred as the quasi-static fading channel. As in the Gaussian RAC model, it can be assumed that the number of active transmitters k is unknown to the transmitters and the receiver. For simplicity, single-antenna communication with real inputs are considered in which the real fading coefficient is $H_i$ for transmitter i. When the number of active transmitters is k, the channel output at time n is given by $$Y=\sum_{i=1}^{k} H_i X_i + Z, \tag{41}$$

where $X_i \in \mathbb{R}^n$ s the channel input from transmitter i, $Z \sim \mathcal{N}(0, N I_n) \in \mathbb{R}^n$ is the additive Gaussian noise, and $Y \in \mathbb{R}^n$ is the channel output. The value N>0 is the noise power in the fading channel.

In the fixed-length, point-to-point, quasi-static fading channel problem, it is known that the maximum achievable rate in the first-order is $$C_\epsilon = \sup\{R: F(R) \le \epsilon\}, \tag{42}$$

which is expressed using a quantity called the outage probability defined as $$F(R) \triangleq \mathbb{P}[C(H^2P)<R]. \tag{43}$$

The outage probability can be viewed as the probability that the fading gain |H| is too small to allow reliable communication over the channel, i.e., under this model, the fading coefficient H dictates whether reliable communication is possible for the current communication epoch.

Unlike the fixed-length fading RAC codes without feedback, use of a code similar to the codes described above in combination with stop-feedback allows the decoding times $n_0 \ldots, n_K$ to vary with the number of active transmitters k; therefore it can achieve higher rates for each number of active transmitters. Generalizing this idea to the quasi-static fading channel model, the decoder can vary the decoding times $n_0 \ldots n_K$ according to the estimate of the fading coefficient vector $H=(H_1, \ldots, H_k)$. This means that to decode k messages, the decoder can decode at a random decoding time $n_k(H)$ rather than a fixed $n_k$, so that the system can opportunistically achieve higher coding rates for every realization of the fading coefficient H=h, rather than being penalized by the small fading coefficients $h_1, \ldots, h_k$ as in the fixed-length scenario for the fading channel. As in the Gaussian RAC problem, stop-feedback can be employed in the coding strategy. At time $n_k(H)$, a positive feedback message signal can be sent to the transmitters to inform the transmitters that decoding has occurred. Otherwise, a negative feedback signal is sent signaling that the transmission continue until the next decoding time $n_{k'}(H)$.

Availability of the Channel Coefficient H at the Transmitters and the Receiver When the fading coefficients H=h is available at the transmitters and the receiver, the channel transition rule can be equivalently expressed as $$Y=\sum_{i=1}^{k} X_i + Z, \tag{44}$$

where the power constraint for the transmitted codewords until time n is $$\|x_1\|^2 \le n h_i^2 P \text{ a. s } \forall i \in [k]. \tag{45}$$

This implies that for every realization of H=h, rates can be achieved such that the available power P for transmitter i is replaced by $h_i^2 P$, and the fixed decoding times $\{n_j\}_{j=0}^K$ are replaced by decoding times that vary with h, i.e., $\{n_j(h)\}^K_{j=0}$.

In many embodiments where neither the transmitters nor the receiver knows the fading coefficients H, the fading coefficients H can be accurately estimated as $\hat{h}$ using the first $n_F$ channel outputs $Y^{[n_F]}$, and then the random decoding times $\{n_j(\hat{h})\}_{j=0}^K$ can be determined based on the estimate $\hat{h}$. Once the decoding times $\{n_j(\hat{h})\}_{j=0}^K$ are determined at the decoder, the knowledge of the first decoding time $n_1(\hat{h})$ is transmitted to all transmitters using $\lceil\log n_1(\hat{h})\rceil$ bits so that the transmitters are aware of the possible decoding times and do not need to listen to the feedback at all time instants. In many embodiments, the decoding times for k≠1 active transmitters, $n_k(\hat{h})$ can be determined from $n_1(\hat{h})$. In other embodiments, the receiver sends the estimate of the fading coefficients $\hat{h}$ to the transmitters (once or with each feedback). The transmitter can then calculate the decoding times $\{n_j(\hat{h})\}_{j=0}^K$.

Confidence Measures with Respect to the Random Decoding Time

As the decoding time is random due to the estimation process, for each j∈[K], it can be desirable to condition on the random decoding times such that $$\mathbb{P}[n_j(\hat{h})>N_j(h)|H=h] \le \delta_j, \text{ for all } jp\mathbf{531}\ \{0, \ldots, K\}, \tag{46}$$

where $N_j(h)$ is a function of the fading coefficients h.

The inequality in (46) provides a performance measure on the random decoding times for each realization of the fading coefficients. The condition in (46) enables the random decoding time, $n_j(\hat{h})$, under the realization of the fading coefficients, h, to be below the target decoding time $N_j(h)$ with high probability.

Code Definitions

Ann $(\{N_j(h), \epsilon_j \delta_j\}_{j=0}^K, n_F, M, P)$-fading RAC code for K transmitters that can be utilized within the fading RAC with stop-feedback can be defined as follows. The decoder estimates the coding coefficient H at time $n_F$ as $\hat{h}$ using the output $Y^{[n_F]}$, and determines the decoding times $\{n_j(\hat{h})\}_{j=0}^K$.In many embodiments, information concerning the determined decoding times is broadcast to all transmitters at time $n_F$. The code can utilize a single encoding function $f: \mathcal{U} \times [M] \rightarrow \mathbb{R}^{n_K(\hat{h})}$ and decoding functions $g_k: \mathcal{U} \times \mathbb{R}^{n_k} \times \mathbb{R} \rightarrow [M]^k \cup \{e\}$ for k=0, . . . , K. The decoder can output the erasure symbol "e" and broadcasts value 0 to the transmitters if it cannot decode at time $n_j(\hat{h})$.

The codewords can satisfy the maximal-power constraints $$\|f(u, m)^{[n_j(\hat{h})]}\|^2 \leq n_j(\hat{h})P \text{ for } m \in [M],\ u \in \mathcal{U},\ j \in [K]. \tag{47}$$

If k transmitters are active, then the average probability of error in decoding k messages at time $n_k(\hat{h})$ is bounded as $$\frac{1}{M^k} \sum_{m_{[k)} \in [M]^k} \mathbb{P}\Bigg[\Big\{ \bigcup_{t: n_t(\hat{h}) \leq n_k(\hat{h}), t \neq k} \Big\{ g_t\Big(U, Y_k^{[n_t(\hat{h})]}, \hat{h}\Big) \neq e \Big\}\Big\} \bigcup \Big\{ g_k\Big(U, Y_k^{[n_k(\hat{h})]}, \hat{h}\Big) \overset{\pi}{\neq} m_{[k]} \Big\} \Bigg| X_{[k]}^{[n_k(\hat{h})]} = f(U, m_{[k]})^{[n_k(\hat{h})]}, H = h \Bigg] \leq \epsilon_k. \tag{48}$$

Furthermore, the random decoding times $n_j(\hat{h})$ satisfy the condition $$\mathbb{P}[n_j(\hat{h}) > N_j(h) \| H = h] \leq \delta_j \text{ for } j \in \{0, \ldots, K\}. \tag{49}$$

Coding Strategy for the Fading Model

In many embodiments, upon receiving $y^{[n_F]}$, the decoder can estimate the norm of the fading coefficient vector $\|\hat{h}\|$ using a maximum likelihood estimator as $$\|\hat{h}\|^2 = \frac{1}{P}\left(\frac{1}{n_F}\|y^{[n_F]}\|^2 - N\right). \tag{50}$$

In many embodiments, the decoder can determine the decoding times $\{n_j(\hat{h})\}_{j=0}^K$ using the estimate $\|\hat{h}\|$. In a number of embodiments, the receiver sends a quantized or other imprecise description of the estimate $\hat{h}$ to the transmitters. In a number of embodiments, the transmitters have access to this list of decoding times via one-time feedback at time $n_F$.

At the encoder, the codewords are generated according to the independent, concatenated, spherical random code structure that is used for the Gaussian RAC (see discussion above). Instead of the decoding times $n_j$, $j \in [K]$ utilized within the Gaussian RAC, communication systems that communicate via a fading RAC can utilize decoding times $\{n_j(\hat{h})\}_{j=0}^K$.

The decoder at time $n_j(\hat{h})$ combines a mismatched information density maximum likelihood decoder with an information-density-based threshold rule that involves defining the conditional mutual information density $$i_{[k]}(x^{[n]}; y^{[n]}|h) \triangleq \log \frac{P_{Y^{[n]}|X_k^{[n]}, H}(y^{[n]}|x_k^{[n]}, h)}{P_{Y^{[n]}|H}(y^{[n]}|h)}. \tag{51}$$

A threshold $\lambda_k \in \mathbb{R}$ can then be set. The decoder can apply the following function to make a decision at each subsequent time $n_k(\hat{h})$:

$$g_k\Big(U, y^{[n_k(\hat{h})]}, \hat{h}\Big) = \begin{cases} m_{[k]} & \text{if } i_{|k|}\Big(f(U, m_{[k]})^{[n_k(\hat{h})]}; y^{[n_k(\hat{h})]}|\hat{h}\Big) \\ & > i_{|k|}\Big(f\big(U, m'_{[k]}\big)^{[n_k(\hat{h})]}; y^{[n_k(\hat{h})]}|\hat{h}\Big) \\ & \text{for any } m'_{[k]} \overset{\pi}{\neq} m_{[k]}, \\ & m_1 \leq \ldots \leq m_k, \\ & i_{[k]}\Big(f(U, m_{[k]})^{[n_k(\hat{h})]}; y^{[n_k(\hat{h})]}\Big|\hat{h}\Big) \geq \lambda_k \\ e & \text{otherwise,} \end{cases} \tag{52}$$

where $\lambda_k$ is a parameter chosen to satisfy the error criterion $\epsilon_k$. Given that output power is not sufficient to estimate the number of active transmitters in the fading model, an information-density-based threshold rule is utilized.

Although the present invention nas been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A communication system, comprising:

a plurality of transmitters that each comprise an encoder, wherein the encoder of a given transmitter is configured to:

receive a start of epoch message;

encode message data as symbols using a rateless code comprising a set of codewords characterized in that they are located within a restricted subset of a multi-dimensional sphere; and receive feedback messages at a predetermined set of potential decoding times;

wherein the transmitter is configured to transmit the symbols until a received feedback message is an end of epoch message; and a receiver comprising a decoder, where the decoder is configured to:

cause a broadcast transmitter to transmit at least one start of epoch message;

receive observed symbols;

at each of a predetermined set of decode times, determine whether a decoding rule is satisfied; and when the decoding rule is satisfied:

decode at least one message based upon the received observed symbols based upon the rateless code; and cause the broadcast transmitter to transmit an end of epoch message.

2. The communication system of claim 1, wherein the restricted subset of the multi-dimensional sphere comprises a subset of a surface of the multi-dimensional sphere and an internal portion of the multi-dimensional sphere proximate the subset of the surface of the multi-dimensional sphere.

3. The communication system of claim 1, wherein the restricted subset of the multi-dimensional sphere comprises a subset of a surface of the multi-dimensional sphere.

4. The communication system of claim 1, wherein the determination of whether the decoding rule is satisfied is based upon the received observed symbols.

5. The communication system of claim 4, wherein the decoding rule combines a threshold rule based on a total power received and a maximum likelihood decoding rule.

6. The communication system of claim 1, wherein:

the codewords located within the restricted subset of the multi-dimensional sphere comprise a number of codewords M of blocklength $n_K$; and the multi-dimensional sphere is characterized by a radius equal to $\sqrt{n_K P}$, wherein P is a maximal (per-codeword) power constraint.

7. The communication system of claim 1, wherein:

the codewords located within the restricted subset of the multi-dimensional sphere comprise a number of codewords M of blocklength nK that are each concatenated from sub-codewords of blocklengths $n_1, n_2-n_1, \ldots, n_K-n_{K-1}$; and each of the sub-codewords of blocklengths $n_1, n_2-n_1, \ldots, n_K-n_{K-1}$ is characterized in that sub-codewords of blocklengths $n_i-n_{i-1}$ lie on a restricted subset of a multi-dimensional sphere of radius $\sqrt{(n_i-n_{i-1})P}$.

wherein P is a maximal (per-codeword) power constraint.

8. The communication system of claim 7, wherein the codewords located within the restricted subset of the multi-dimensional sphere are further characterized in that, when k transmitters from the plurality of transmitters are active, codewords of blocklength nk formed from concatenating the sub-codewords of blocklengths $n_1, n_2-n_1, \ldots, n_K-n_{K-1}$ are located within a restricted subset of a multi-dimensional sphere $\sqrt{n_K P}$.

9. The communication system of claim 1, wherein multiple transmitters in the plurality of transmitters are configured to select the same rateless code to use in the encoding of the message data as the symbols.

10. The communication system of claim 1, wherein at least two of the plurality of transmitters are configured to select different rateless codes to use in the encoding of the message data as the symbols.

11. The communication system of claim 10, wherein the receiver is further configured to apply the decoding rules at separate predetermined times with respect to each of a set of different codebooks.

12. The communication system of claim 1, wherein the broadcast transmitter is configured to send a negative feedback message when the decoding rule is not satisfied at a predetermined decode time.

13. The communication system of claim 1, wherein the encoder is configured to continue to encode the message data as the symbols using the rateless code in response to receipt of a negative feedback message.

14. The communication system of claim 1, wherein the receiver is further configured to measure channel characteristics and select the predetermined set of decoding times based upon the measured channel characteristics.

15. A transmitter system, comprising:

a receiver configured to receive a start of epoch message;

an encoder configured to:

encode message data as symbols using a rateless code comprising a set of codewords characterized in that they are located within a restricted subset of a multi-dimensional sphere; and a modulator configured to transmit the symbols encoded by the encoder;

wherein the receiver is further configured to receive an end of epoch message at one of a predetermined set of times; and wherein the modulator is configured to transmit the symbols encoded by the encoder until an end of epoch message is received by the receiver.

16. The transmitter system of claim 15, wherein the encoder is configured to continue to encode message data as symbols using the rateless code in response to receipt of a negative feedback message.

17. The transmitter system of claim 15, wherein the restricted subset of the multi-dimensional sphere comprises a subset of a surface of the multi-dimensional sphere and an internal portion of the multi-dimensional sphere proximate the subset of the surface of the multi-dimensional sphere.

18. The transmitter system of claim 15, wherein the restricted subset of the multi-dimensional sphere comprises a subset of a surface of the multi-dimensional sphere.

19. A receiver system, comprising:

a decoder configured to select at least one codebook;

a transmitter configured to transmit at least one start of epoch message;

a receiver configured to receive observed symbols;

wherein the decoder is further configured to:

determine whether a decoding rule is satisfied at each of a predetermined set of decode times; and when the decoding rule is satisfied:

decode at least one message based upon the received observed symbols based upon a rateless code comprising a set of codewords characterized in that they are located within a restricted subset of a multi-dimensional sphere; and cause the transmitter to transmit an end of epoch message.

20. The receiver system of claim 19, wherein the determination of whether the decoding rule is satisfied is based upon the received observed symbols.

21. The receiver system of claim 19, wherein the decoding rule combines a threshold rule based on a total power received and a maximum likelihood decoding rule.

22. The receiver system of claim 19, wherein the transmitter is configured to send a negative feedback message when the decoding rule is not satisfied at a predetermined decode time.

23. The receiver system of claim 19, wherein the restricted subset of the multi-dimensional sphere comprises a subset of a surface of the multi-dimensional sphere and an internal portion of the multi-dimensional sphere proximate the subset of the surface of the multi-dimensional sphere.

24. The receiver system of claim 19, wherein the restricted subset of the multi-dimensional sphere comprises a subset of a surface of the multi-dimensional sphere.

* * * * *

UNITED STATES PATENT AND TRADEMARK OFFICE

CERTIFICATE OF CORRECTION

PATENT NO. : 11,689,318 B2
APPLICATION NO. : 17/146462
DATED : June 27, 2023
INVENTOR(S) : Yavas et al.

It is certified that error appears in the above-identified patent and that said Letters Patent is hereby corrected as shown below:

In the Claims

Column 26 (Claim 2, Line 60): add --to-- after "proximate".
Column 27 (Claim 6, Line 5): add --set of-- before "codewords"; (Claim 7, Line 13): add --set of-- before "codewords"; (Claim 8, Line 25): add --set of-- before "codewords"; (Claim 14, Line 54): replace "decoding" with "decode".
Column 28 (Claim 17, Line 18): add --to-- after "proximate"; (Claim 19, Line 27): add --and-- after "message;"; (Claim 23, Line 56): add --to-- after "proximate".

Signed and Sealed this
Twenty-second Day of August, 2023

Katherine Kelly Vidal

Katherine Kelly Vidal
*Director of the United States Patent and Trademark Office*